US008887110B1

(12) United States Patent
Zlatanovici et al.

(10) Patent No.: US 8,887,110 B1
(45) Date of Patent: Nov. 11, 2014

(54) METHODS FOR DESIGNING INTERGRATED CIRCUITS WITH AUTOMATICALLY SYNTHESIZED CLOCK DISTRIBUTION NETWORKS

(75) Inventors: Radu Zlatanovici, Oakland, CA (US); Christoph Albrecht, Berkeley, CA (US); Saurabh Kumar Tiwary, Berkeley, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/489,411

(22) Filed: Jun. 5, 2012

Related U.S. Application Data

(62) Division of application No. 12/197,123, filed on Aug. 22, 2008, now Pat. No. 8,205,182.

(60) Provisional application No. 60/957,452, filed on Aug. 22, 2007.

(51) Int. Cl.
*G06F 17/50* (2006.01)

(52) U.S. Cl.
CPC ........ *G06F 17/5081* (2013.01); *G06F 17/5077* (2013.01); *G06F 17/505* (2013.01); *G06F 17/5072* (2013.01)
USPC ........... 716/104; 716/108; 716/113; 716/122; 716/123; 716/129; 716/130

(58) Field of Classification Search
CPC ............ G06F 17/5081; G06F 17/5077; G06F 17/5072; G06F 17/505
USPC ......... 716/104, 108, 113, 122, 123, 129, 130; 703/16
See application file for complete search history.

(56) References Cited

U.S. PATENT DOCUMENTS

| 5,452,239 | A | * | 9/1995 | Dai et al. | 703/19 |
| 5,475,830 | A | * | 12/1995 | Chen et al. | 716/108 |
| 5,649,176 | A | * | 7/1997 | Selvidge et al. | 713/400 |
| 5,828,579 | A | * | 10/1998 | Beausang | 716/102 |
| 5,910,740 | A | * | 6/1999 | Underwood | 327/149 |
| 5,917,729 | A | * | 6/1999 | Naganuma et al. | 716/122 |

(Continued)

FOREIGN PATENT DOCUMENTS

| JP | 09115910 A | * | 5/1997 | H01L 21/321 |
| JP | 2002303652 A | * | 10/2002 | G01R 31/28 |
| JP | 2003216271 A | * | 7/2003 | G06F 1/10 |

OTHER PUBLICATIONS

NN881174, "Placement-Preserving TIming Adjustment for Very Large Scale Integrated Circuits", IBM Technical Disclosure Bulletin, Nov. 1988, vol. 31, No. 6, pp. 74-77 (4 pages).*

(Continued)

*Primary Examiner* — Phallaka Kik
(74) *Attorney, Agent, or Firm* — Alford Law Group, Inc.; Tobi C. Clinton

(57) ABSTRACT

In one embodiment of the invention, a method for designing an integrated circuit is disclosed. The method includes automatically partitioning clock sinks of an integrated circuit design into a plurality of partitions; automatically synthesizing a clock tree from a master clock generator into the plurality of partitions to minimize local clock skew within each of the plurality of partitions; and automatically synthesizing clock de-skew circuitry into each of the plurality of partitions to control clock skew between neighboring partitions.

5 Claims, 19 Drawing Sheets

(56) References Cited

U.S. PATENT DOCUMENTS

| | | | |
|---|---|---|---|
| 5,974,245 A * | 10/1999 | Li et al. .................... | 716/55 |
| 6,175,157 B1 * | 1/2001 | Morifuji .................... | 257/777 |
| 6,216,257 B1 * | 4/2001 | Agrawal et al. ............ | 326/41 |
| 6,272,668 B1 * | 8/2001 | Teene ........................ | 716/113 |
| 6,724,084 B1 * | 4/2004 | Hikita et al. ............... | 257/737 |
| 6,782,520 B1 * | 8/2004 | Igusa et al. ................ | 716/114 |
| 6,836,877 B1 * | 12/2004 | Dupenloup ................ | 716/103 |
| 6,910,199 B2 * | 6/2005 | Sachs ........................ | 716/124 |
| 7,234,123 B2 * | 6/2007 | Sachs ........................ | 716/105 |
| 7,257,782 B2 * | 8/2007 | Ho et al. .................... | 716/113 |
| 7,518,401 B2 * | 4/2009 | Vadi et al. ................. | 326/41 |
| 7,624,363 B2 * | 11/2009 | Baumgartner et al. ..... | 716/107 |
| 7,669,154 B2 * | 2/2010 | Hosono ..................... | 716/135 |
| 7,804,504 B1 * | 9/2010 | Agarwal .................... | 345/505 |
| 7,840,927 B1 * | 11/2010 | Dozier et al. .............. | 716/123 |
| 7,868,283 B2 * | 1/2011 | Mabuchi ................... | 250/208.1 |
| 8,156,456 B1 * | 4/2012 | Rahman et al. ........... | 716/104 |
| 8,166,438 B2 * | 4/2012 | Masleid .................... | 716/119 |
| 8,185,860 B2 * | 5/2012 | Burstein et al. ........... | 716/126 |
| 8,539,402 B1 * | 9/2013 | Bhardwaj et al. ......... | 716/105 |
| 8,572,532 B1 * | 10/2013 | Singh et al. ............... | 716/108 |
| 8,640,066 B1 * | 1/2014 | Gupta et al. .............. | 716/108 |
| 8,683,414 B2 * | 3/2014 | Kanno et al. .............. | 716/120 |
| 8,762,923 B2 * | 6/2014 | Hoberman et al. ........ | 716/133 |
| 2002/0184600 A1 * | 12/2002 | Sachs ......................... | 716/1 |
| 2004/0040007 A1 * | 2/2004 | Harn .......................... | 716/11 |
| 2004/0210857 A1 * | 10/2004 | Srinivasan ................. | 716/2 |
| 2004/0230933 A1 * | 11/2004 | Weaver et al. ............. | 716/12 |
| 2005/0022146 A1 * | 1/2005 | Sachs ......................... | 716/9 |
| 2005/0028128 A1 * | 2/2005 | Sachs ......................... | 716/18 |
| 2006/0015313 A1 * | 1/2006 | Wang et al. ................ | 703/14 |
| 2006/0038300 A1 * | 2/2006 | Tanida et al. ............... | 257/773 |
| 2006/0253821 A1 * | 11/2006 | Kitahara et al. ............ | 716/6 |
| 2006/0294485 A1 * | 12/2006 | Kaul et al. .................. | 716/10 |
| 2008/0042046 A1 * | 2/2008 | Mabuchi .................... | 250/208.1 |
| 2008/0141206 A1 * | 6/2008 | He .............................. | 716/12 |
| 2008/0216040 A1 * | 9/2008 | Furnish et al. .............. | 716/10 |
| 2008/0229266 A1 * | 9/2008 | Bueti et al. ................. | 716/6 |
| 2008/0313580 A1 * | 12/2008 | Anand et al. ............... | 716/3 |
| 2009/0178013 A1 * | 7/2009 | Wang et al. ................ | 716/2 |
| 2009/0178014 A1 * | 7/2009 | Fredrickson et al. ....... | 716/2 |
| 2009/0254874 A1 * | 10/2009 | Bose .......................... | 716/6 |
| 2009/0319977 A1 * | 12/2009 | Saxena et al. .............. | 716/13 |
| 2010/0017775 A1 * | 1/2010 | Kanno et al. ............... | 716/16 |
| 2010/0199237 A1 * | 8/2010 | Kim et al. .................. | 716/3 |
| 2010/0257495 A1 * | 10/2010 | Wu ............................. | 716/5 |
| 2011/0209112 A1 * | 8/2011 | Laub .......................... | 716/132 |
| 2012/0139092 A1 * | 6/2012 | Su et al. ..................... | 257/660 |
| 2012/0153433 A1 * | 6/2012 | Yen et al. ................... | 257/531 |

OTHER PUBLICATIONS

Atrash et al. "A Technique to Deskew Differential PCB Traces", IEEE, ISCAS, 2004, pp. II-565 to II-568.*

Liu et al. "Low-Power Clock De-Skew Buffer for High-Speed Digital Circuits", IEEE Journal of Solid-State Circuits, vol. 34, No. 4, Apr. 1999, pp. 554-558.*

Maxim, "A 0.16-2.55-GHz CMOS Active Clock Deskewing PLL Using Analog Phase Interpolation", IEEE Journal of Solid-State Circuits, vol. 40, No. 1, Jan. 2005, pp. 110-131.*

Torralba et al., "A VLSI for Deskewing and Fault Tolerance in LVDS Links", IEEE, 2005, pp. 537-542.*

Kobayashi, English Machine Translation of Japanese Document No. JP-2003-216271, translated on Jun. 28, 2014, 17 pages.*

* cited by examiner

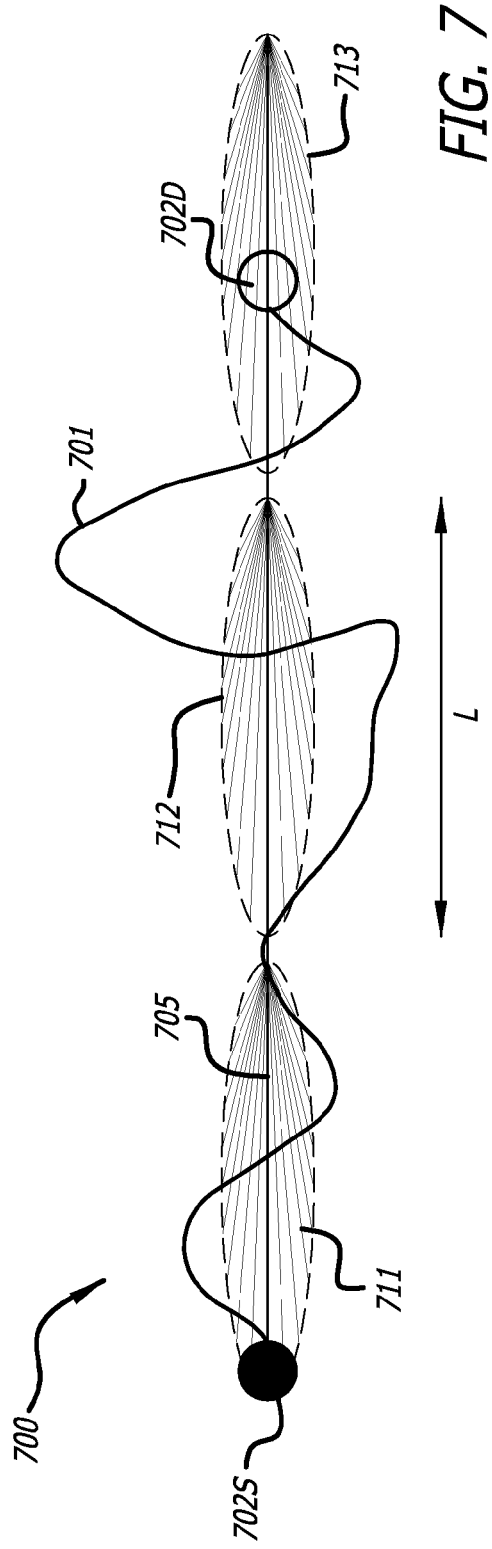

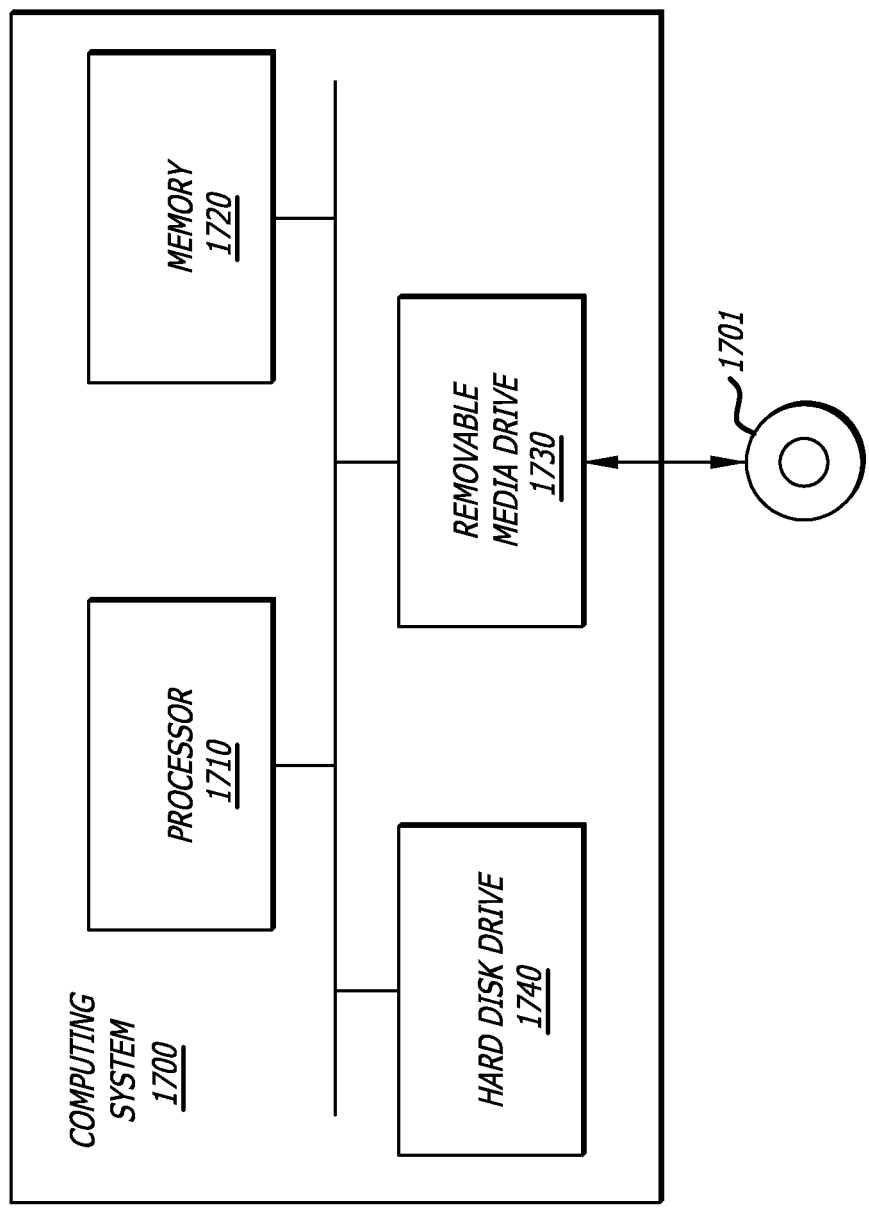

METHODS FOR DESIGNING INTERGRATED CIRCUITS WITH AUTOMATICALLY SYNTHESIZED CLOCK DISTRIBUTION NETWORKS

CROSS REFERENCE TO RELATED APPLICATIONS

This non-provisional United States (U.S.) patent application claims the benefit of and is a divisional of U.S. patent application Ser. No. 12/197,123 entitled AUTOMATIC SYNTHESIS OF CLOCK DISTRIBUTION NETWORKS filed on Aug. 22, 2008 by inventors Zlatanovici et al., now allowed. U.S. patent application Ser. No. 12/197,123 claims the benefit of provisional U.S. Patent Application No. 60/957,452 filed on Aug. 22, 2007 by inventors, Zlatanovici et al., entitled AUTOMATIC CLOCK DISTRIBUTION NETWORK SYNTHESIS FOR APPLICATION SPECIFIC INTEGRATED CIRCUITS, which is incorporated herein by reference.

FIELD

The embodiments of the invention relate generally to circuit synthesis. More particularly, the embodiments of the invention relate to clock tree synthesis for an integrated circuit.

BACKGROUND

In a synchronous integrated circuit (IC), a clock signal is routed from an internal clock generator or an external clock input signal to registers and other circuits in order to control the sequences and timing of control and data operations therein. Clocked storage devices, such as flip-flops, latches, registers and other clocked storage circuits, and their respective clock input may be referred to herein as a sink or clock sink. Ideally, a clock signal should arrive at all the sinks at exactly the same time. However in reality, the clock signal arrives at different times at different sinks such as from asymmetries in clock drivers/buffers, the clock distribution network, loading, process variations, and interconnect delays. The difference between the arrival times of the clock signal at different sinks is called clock skew. More particularly, clock skew is the phase shift in a single clock distribution network resulting from the different delays in the clock signal to different sinks.

Unintentional clock skew is an undesirable effect in synchronous circuits in which the clock signal arrives at the registers at times different from the desired times. During logic synthesis of an integrated circuit, clock skew is considered a parasitic effect and is thus included in the design margin. However with ever increasing clock frequencies and performance requirements in today's application specific integrated circuits, the design margin required to cover clock skews due to process variations and interconnect delays can become significant.

Unintentional clock skew has become an expensive overhead that can reduce design margins and may negatively impact an integrated circuits' performance and robustness to process variations. If unintentional clock skew can be reduced during logic synthesis, a more optimized design of an integrated circuit may be achieved.

BRIEF SUMMARY

The embodiments of the invention are best summarized by the claims that follow below.

Briefly, in accordance with one or more embodiments of the invention, clock distribution networks for integrated circuits are automatically synthesized so as to minimize and control the clock skew at clock sinks within the integrated circuits. The clock distribution networks are synthesized with distributed, dynamic de-skew circuits to minimize and control the clock skew at the clock sinks. Arrival times of clock signals in adjacent partitions of the circuit are compared using phase detectors. The de-skew circuit within each partition receives the results of the phase detectors at the boundaries of the neighboring partitions. A control algorithm designed into the clock de-skew circuit adjusts a variable delay buffer such that the clock skew between neighboring partitions is minimized.

BRIEF DESCRIPTIONS OF THE DRAWINGS

Figure 1A:
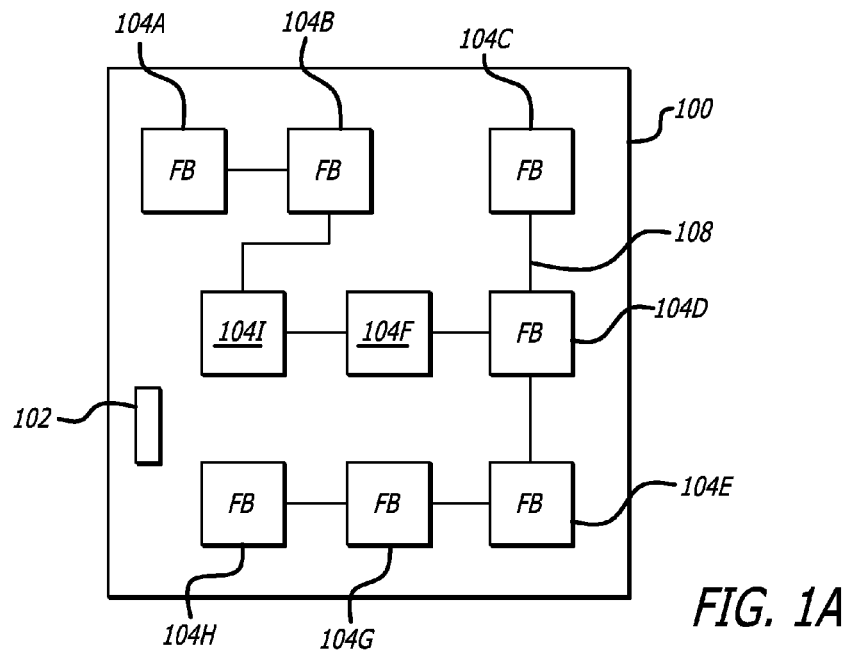
FIG. 1A illustrates placement of a clock generator or clock source and functional blocks (FB) in an integrated circuit.
Figure 1B:
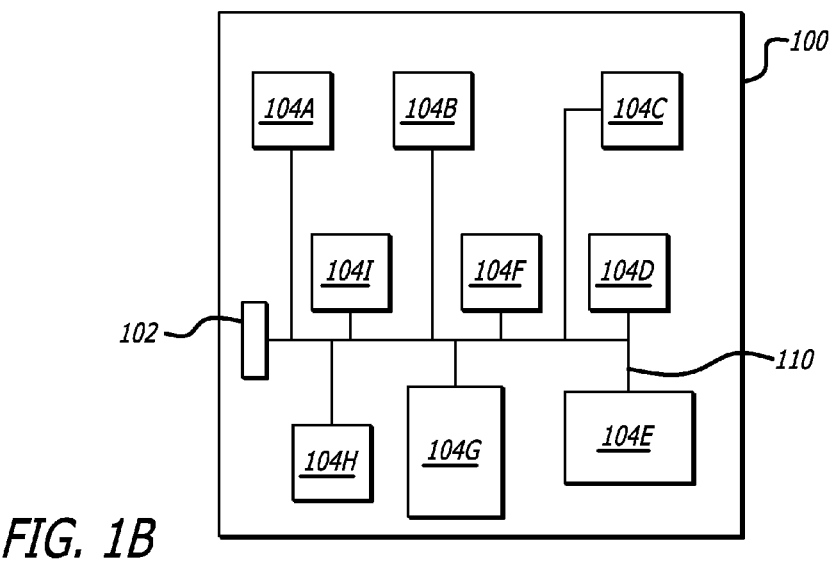
FIG. 1B illustrates global routing of a clock tree from a clock source to the respective functional blocks by interconnect wiring.
Figure 1C:
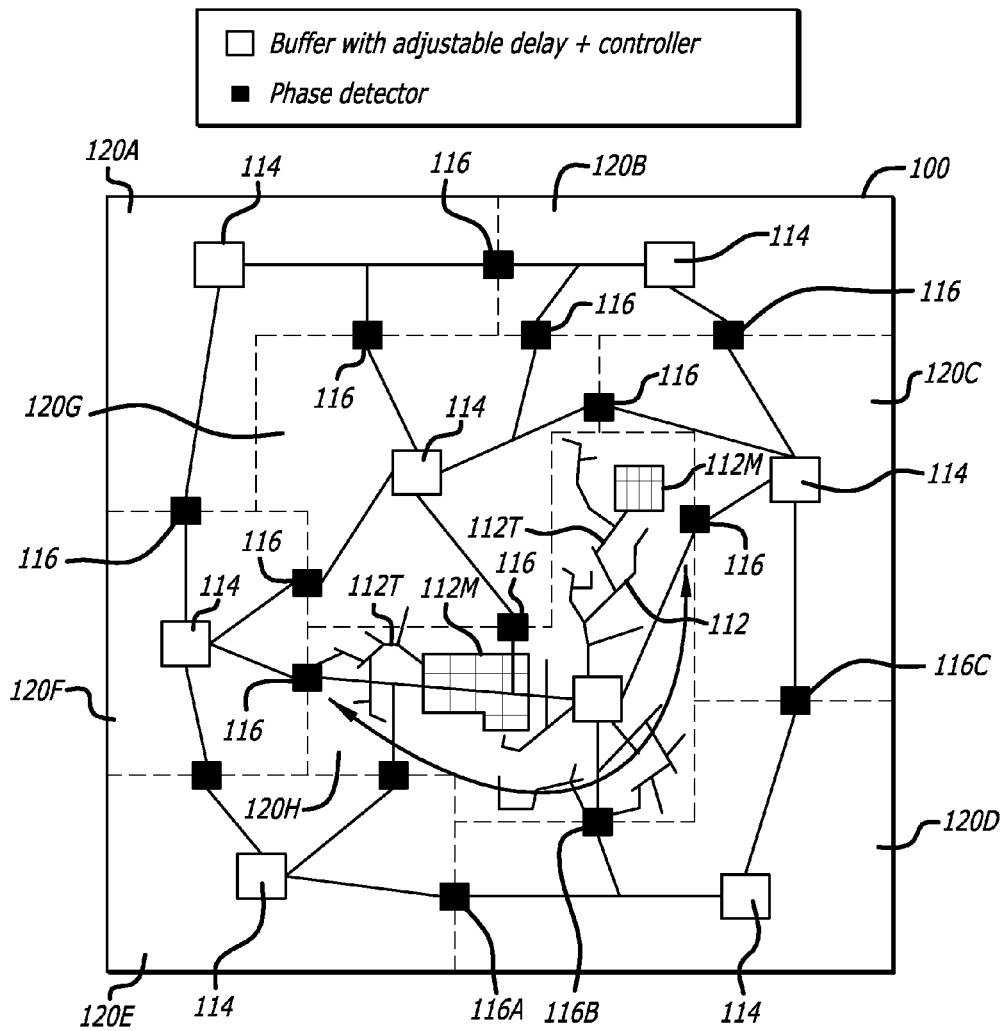

FIG. 1C a simplified flat partitioning of the clock distribution network is illustrated using a map-style representation without any overlapping partitions.

Figure 2:
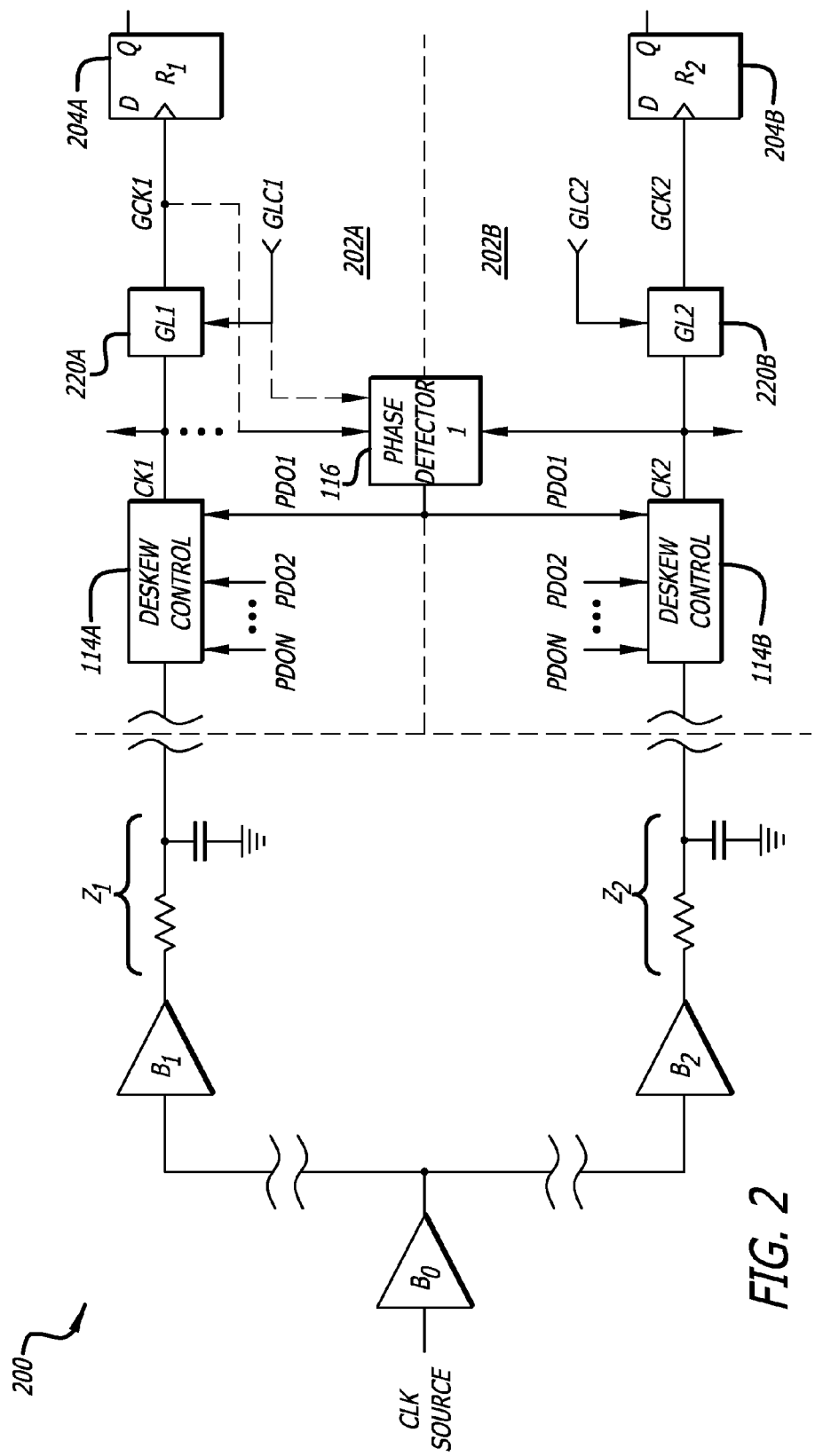

FIG. 2 illustrates a block diagram of an exemplary clock distribution network for a pair of neighboring partitions.

Figure 3A:
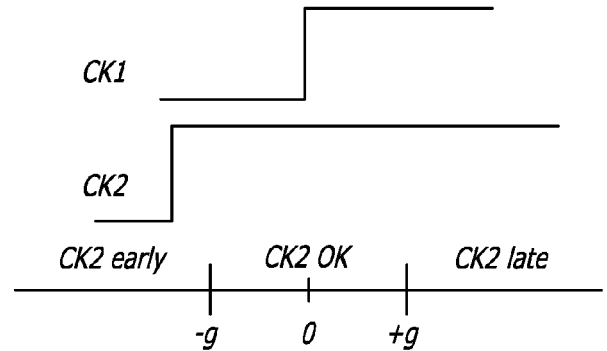
Figure 3B:
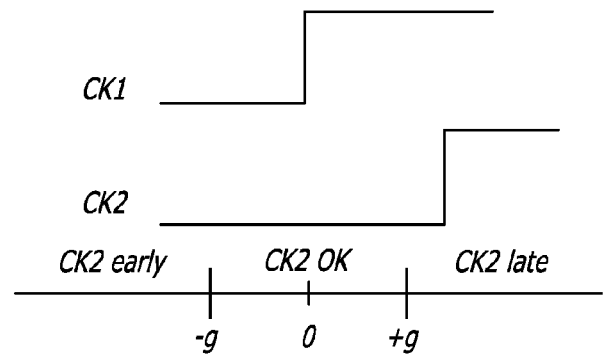
Figure 3C:
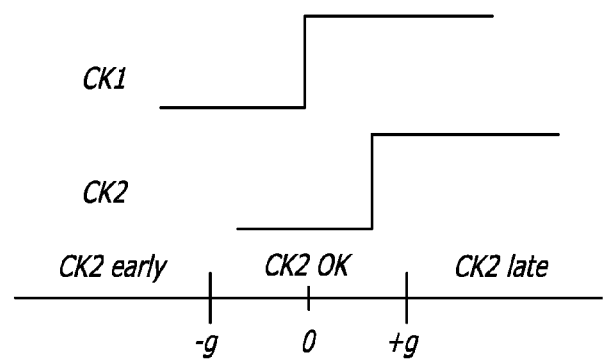

FIGS. 3A-3C are waveform diagrams of two local clocks for comparison by a phase detector to determine clock skew.

Figure 4A:
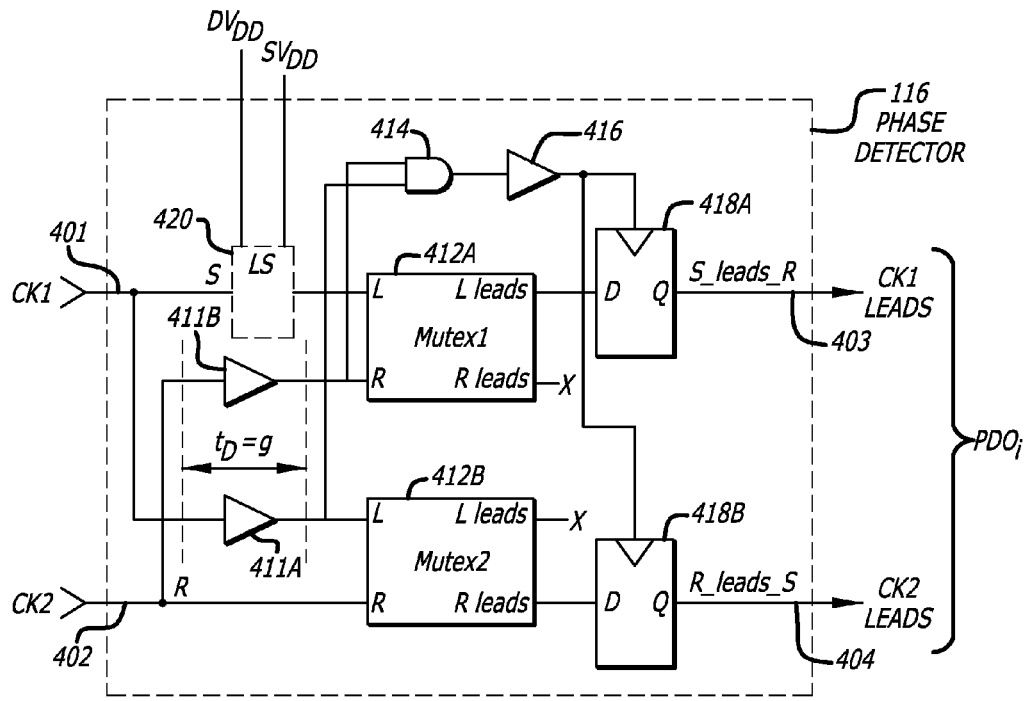

FIG. 4A illustrates a block diagram of an exemplary phase detector.

Figure 4B:
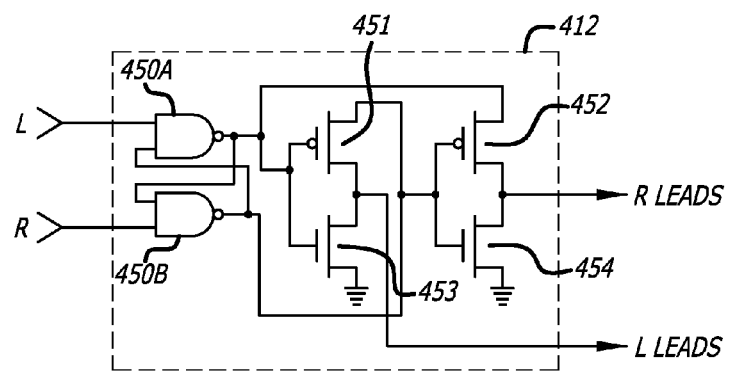

FIG. 4B illustrates schematic diagram of an exemplary embodiment of a mutual exclusion (mutex) element for the phase detector of FIG. 4A.

Figure 5:
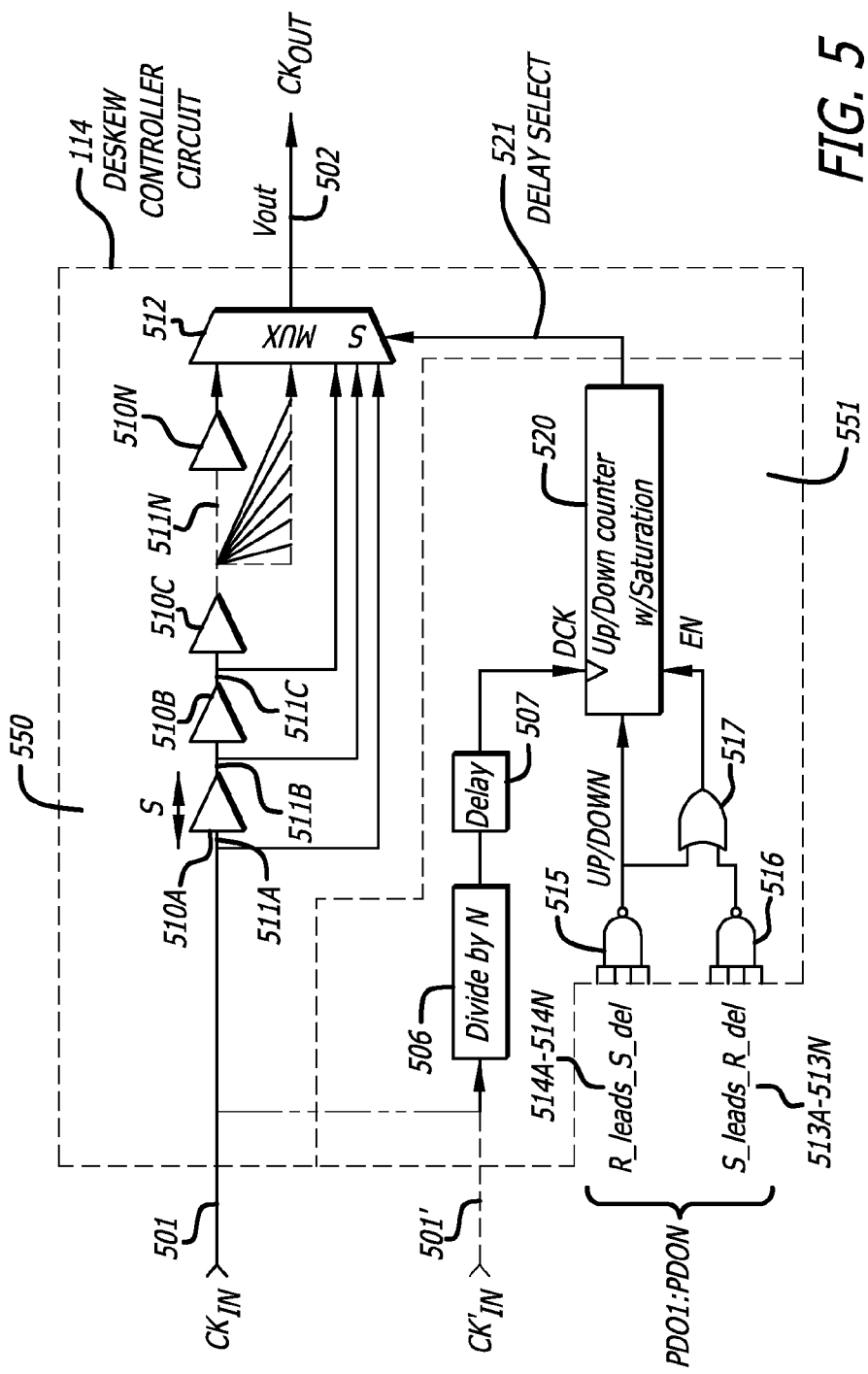

FIG. 5 illustrates a schematic block diagram of an exemplary deskew control circuit.

Figure 6A:
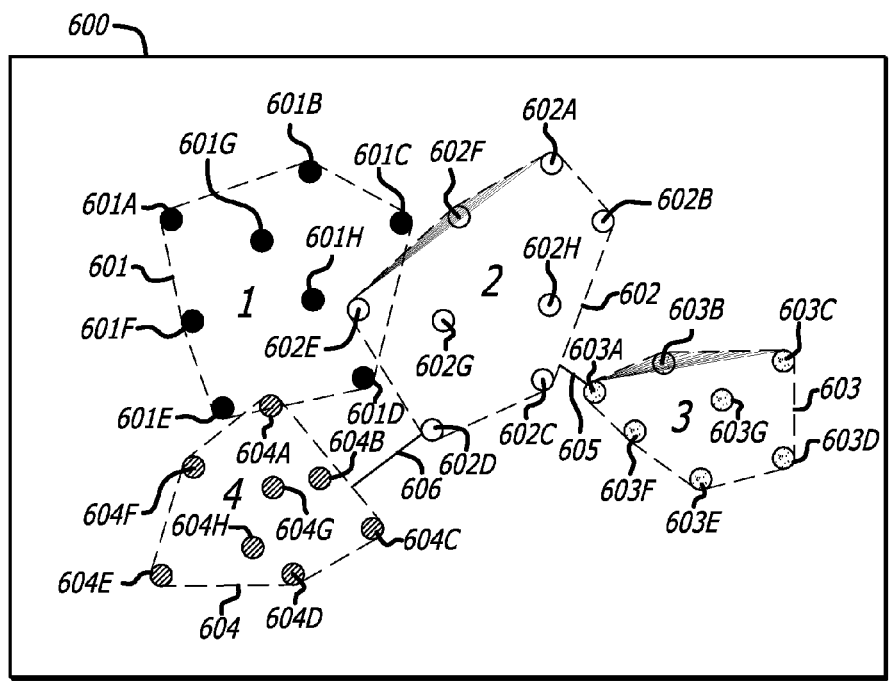

FIG. 6A illustrates an exemplary partition of clock sinks on an integrated circuit into partitions and corresponding partition boundaries.

Figure 6B:
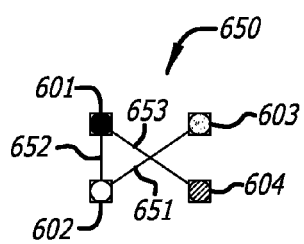

FIG. 6B illustrates an exemplary partition graph to show neighboring relationships between partitions of an exemplary partitioning of clock sinks.

FIG. 7 illustrates an exemplary partition graph with a critical data path.

Figure 8:
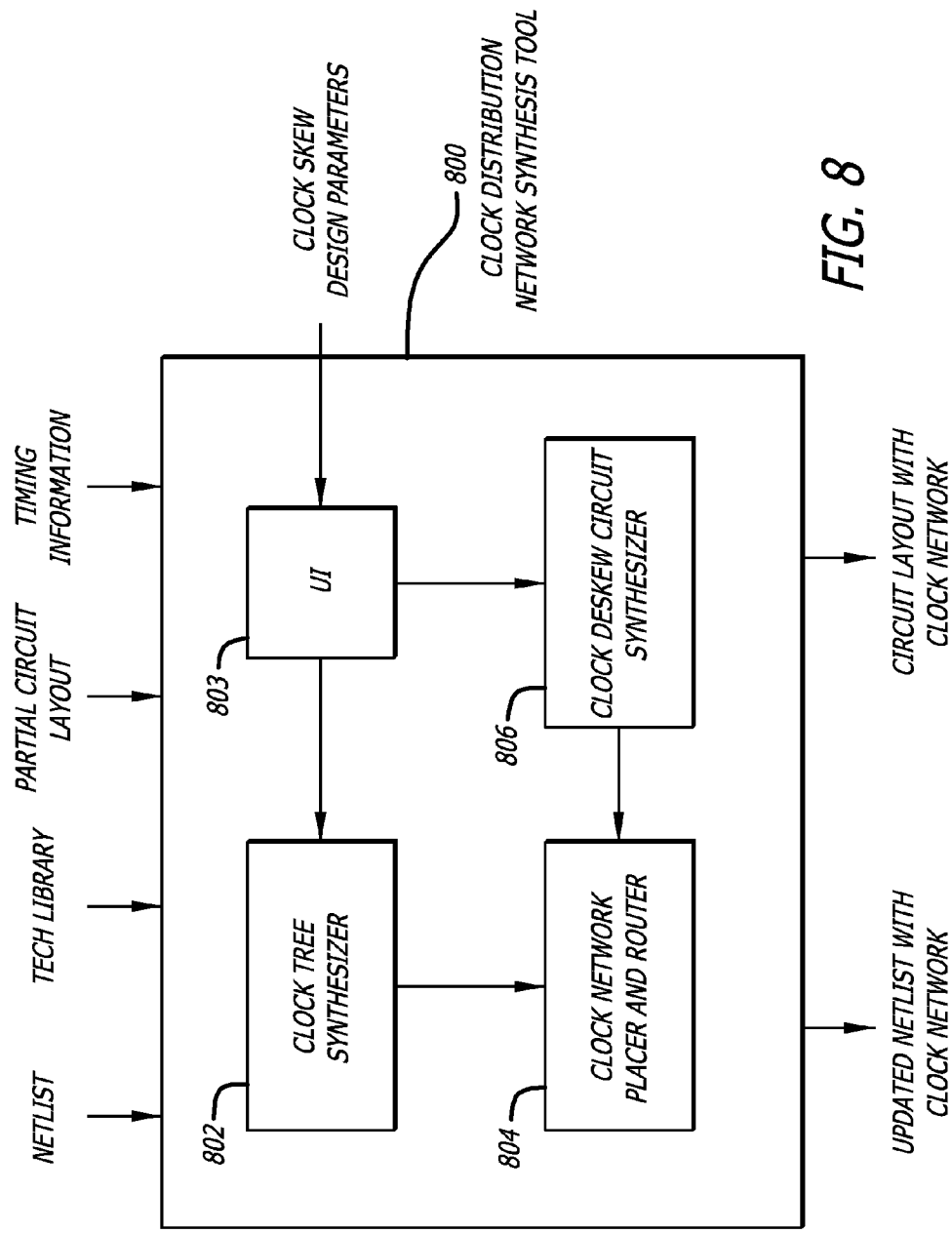

FIG. 8 illustrates a block diagram of a clock distribution network synthesis tool.

Figure 9:
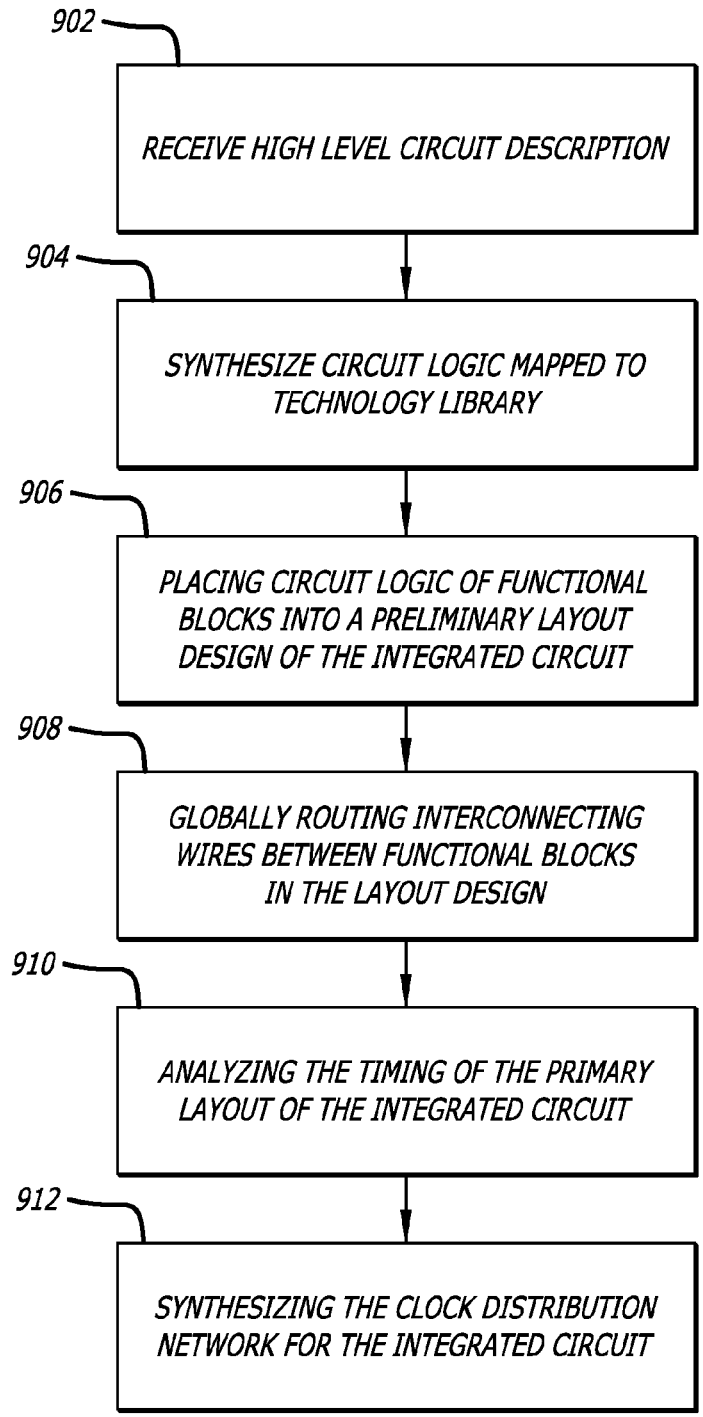

FIG. 9 illustrates a flow chart of a method of designing an integrated circuit.

Figure 10:
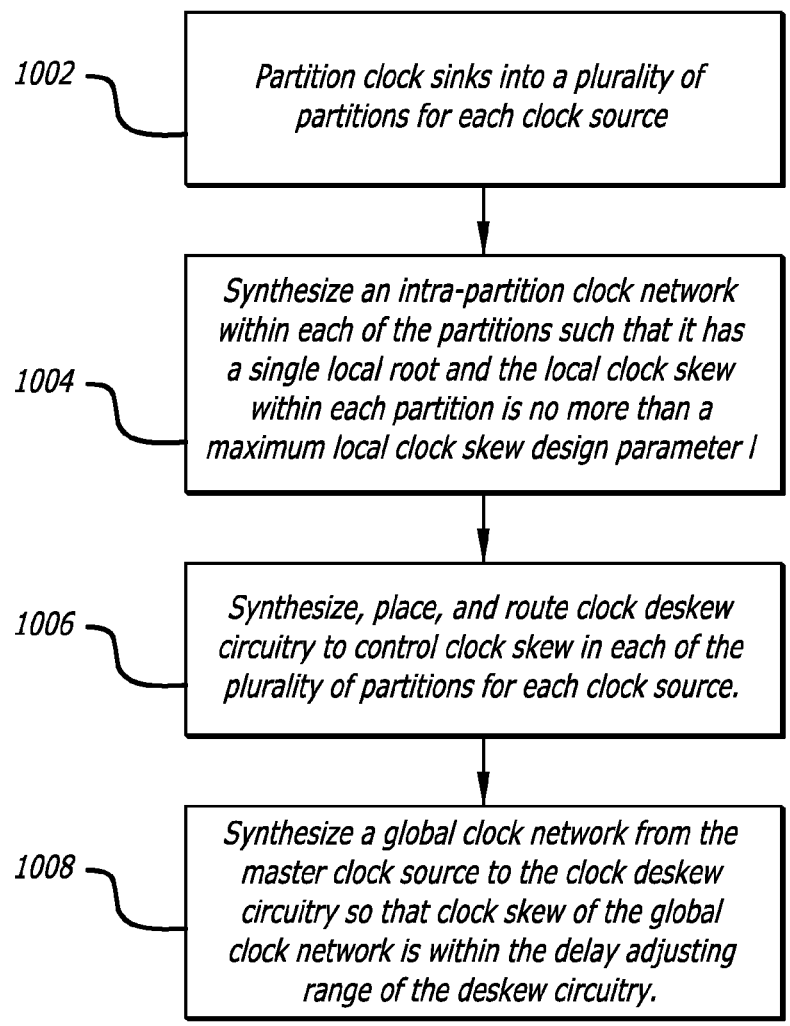

FIG. 10 illustrates a flow chart of a method of synthesizing a clock distribution network of an integrated circuit.

Figure 11:
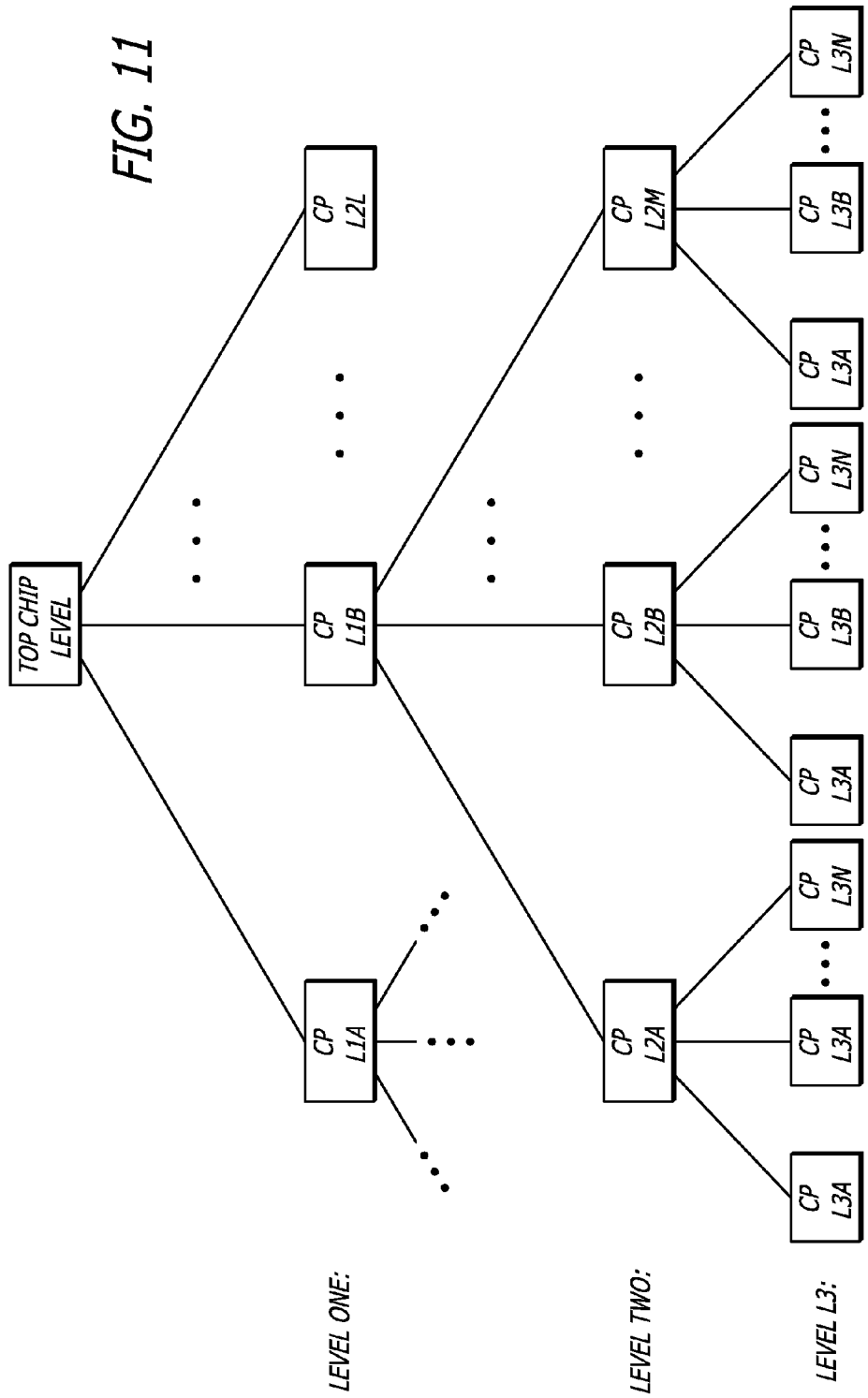

FIG. 11 is a diagram illustrating hierarchical clock partitioning for the synthesis of the clock distribution network with dynamic clock de-skewing circuit synthesis.

Figure 12:
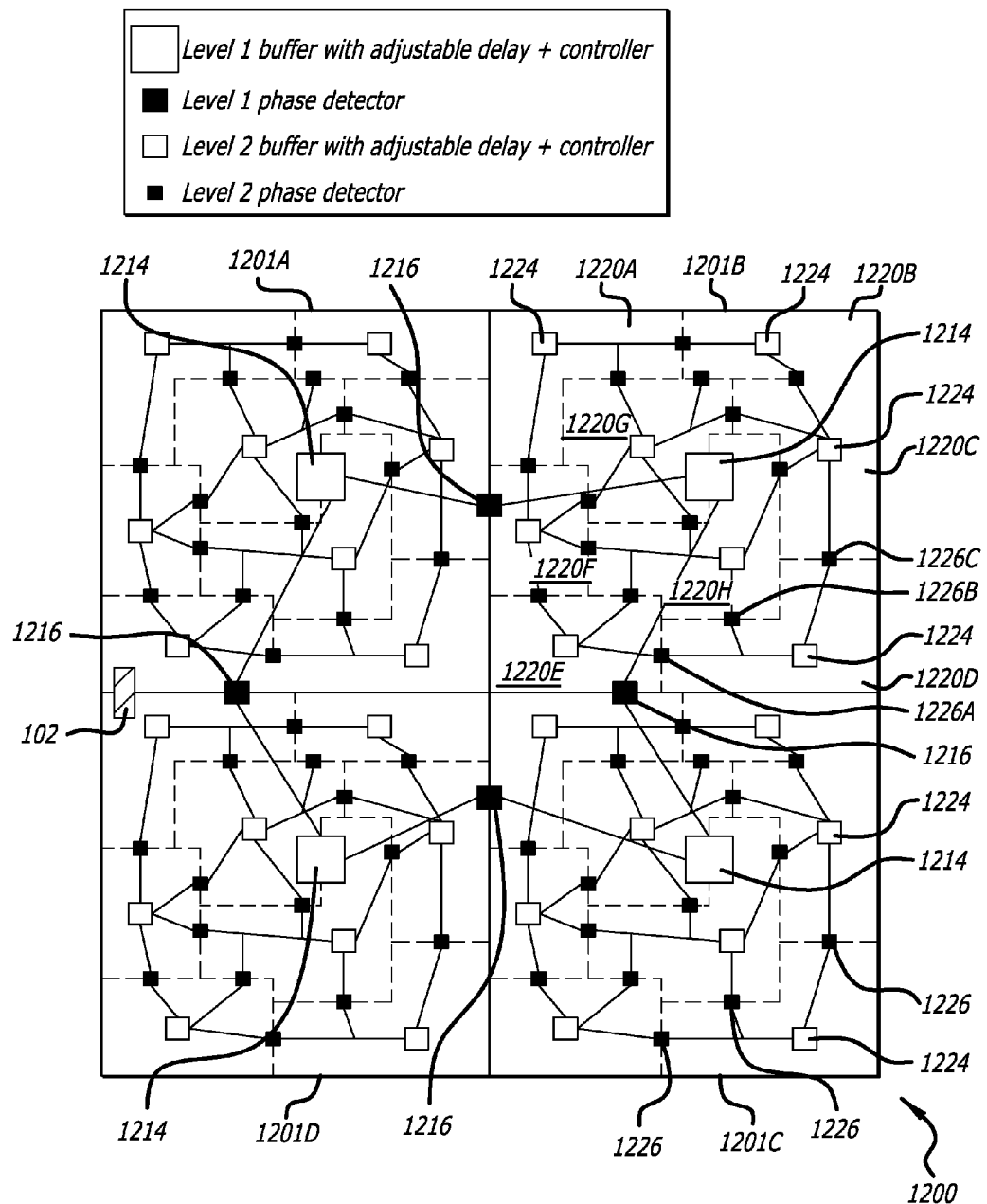

FIG. 12 is a block diagram of an integrated circuit with an exemplary two level hierarchical clock partition for one clock source.

Figure 13:
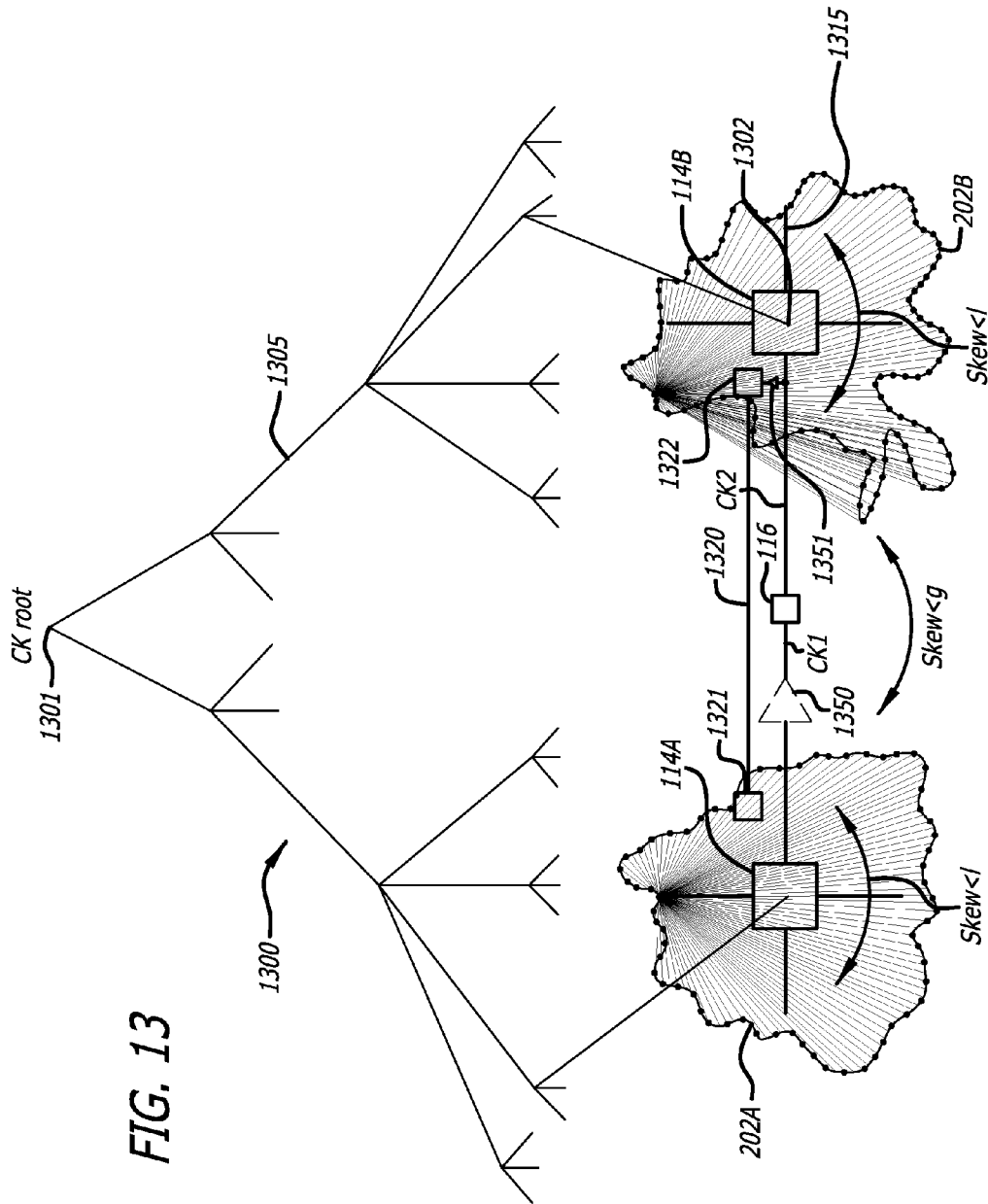

FIG. 13 is a schematic diagram of a slice of a clock distribution network.

Figure 14A:
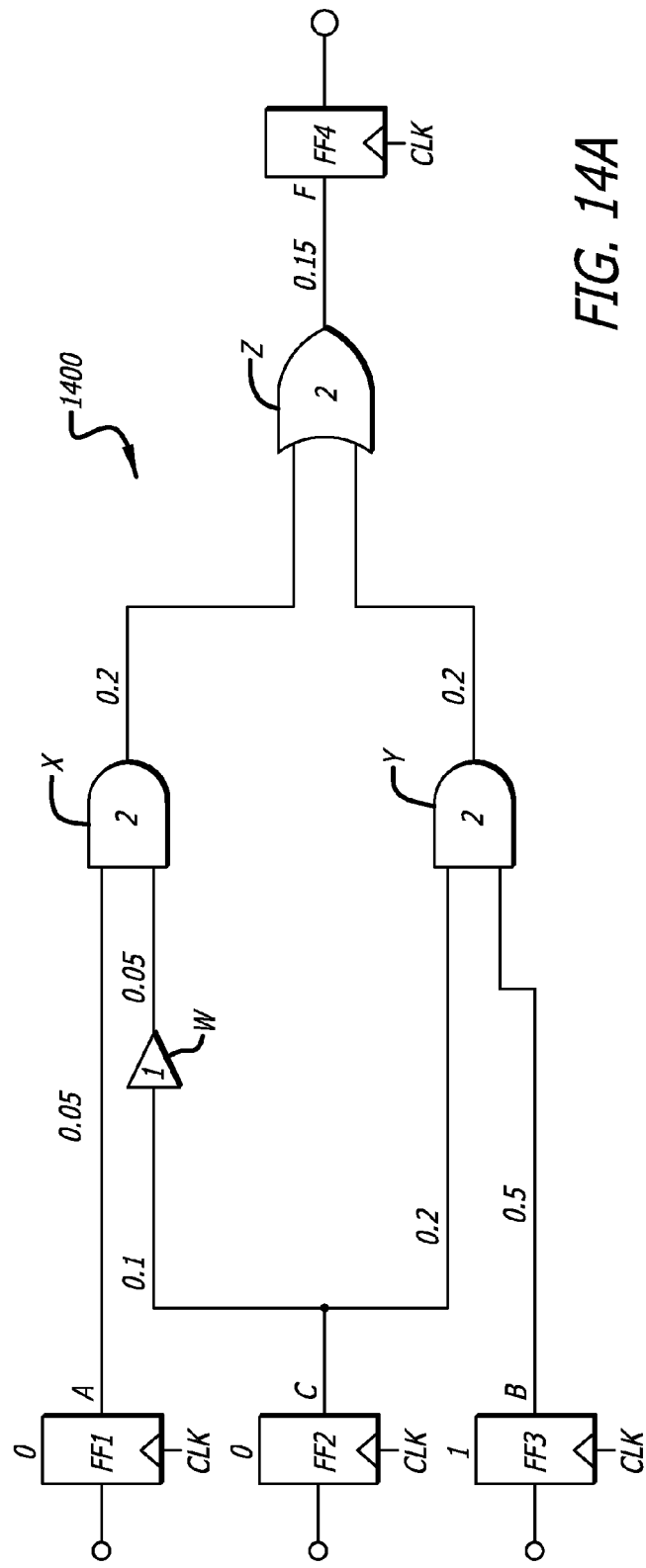

FIG. 14A is a schematic diagram of an exemplary circuit upon which to perform a timing analysis.

Figure 14B:
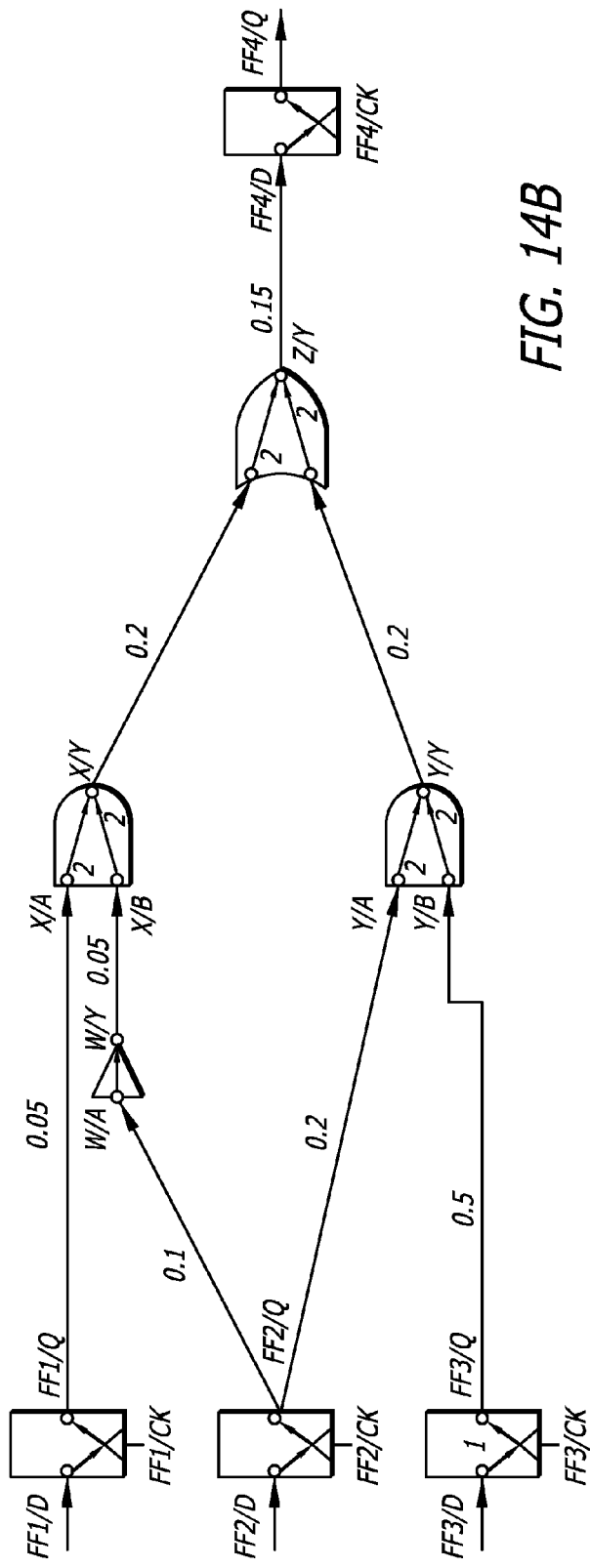

FIG. 14B is a timing graph 1401 of the exemplary circuit illustrated in FIG. 14A.

Figure 15:
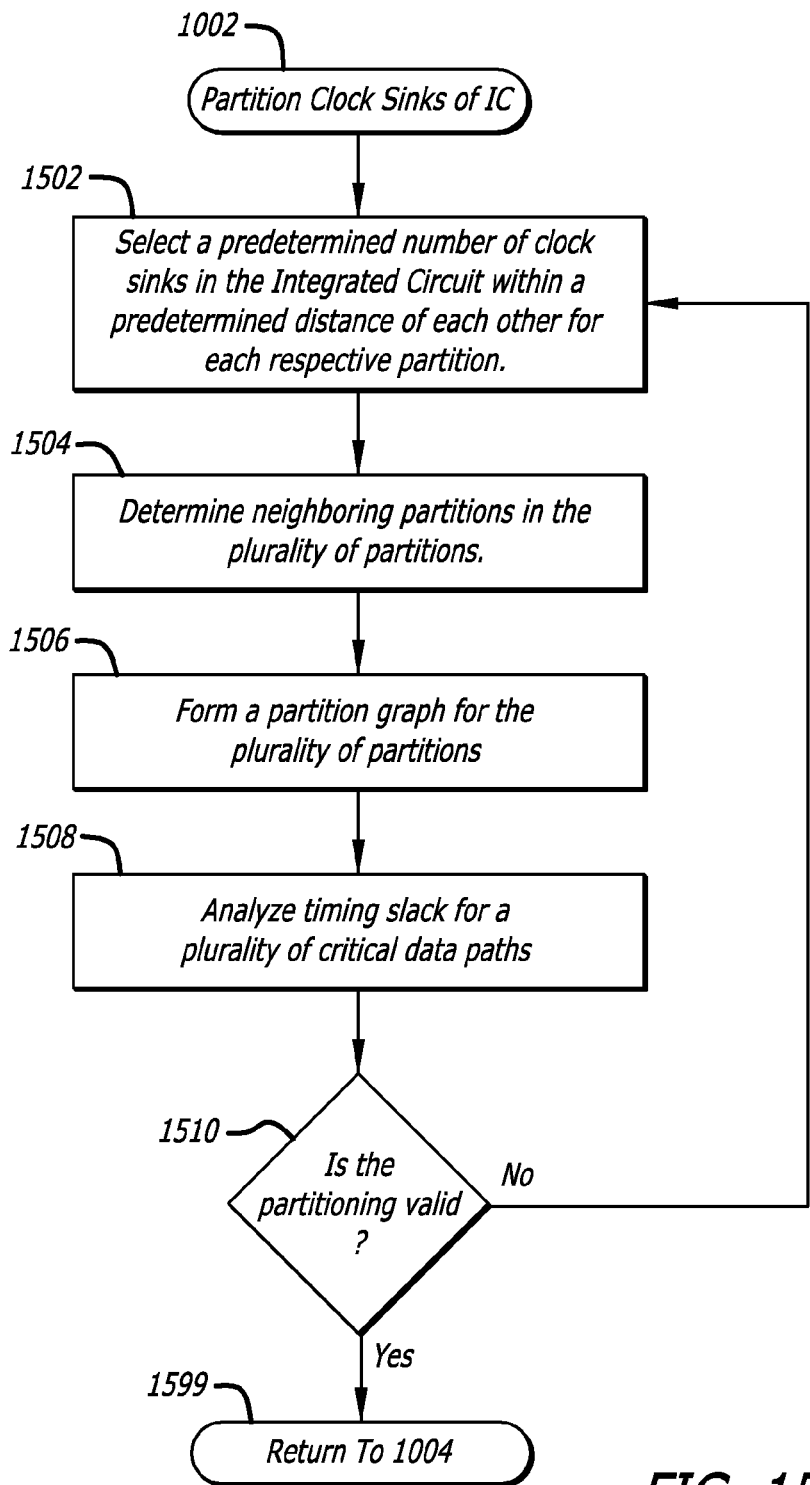

FIG. 15 is an exemplary method of automatically partitioning clock sinks in an integrated circuit.

Figure 16:
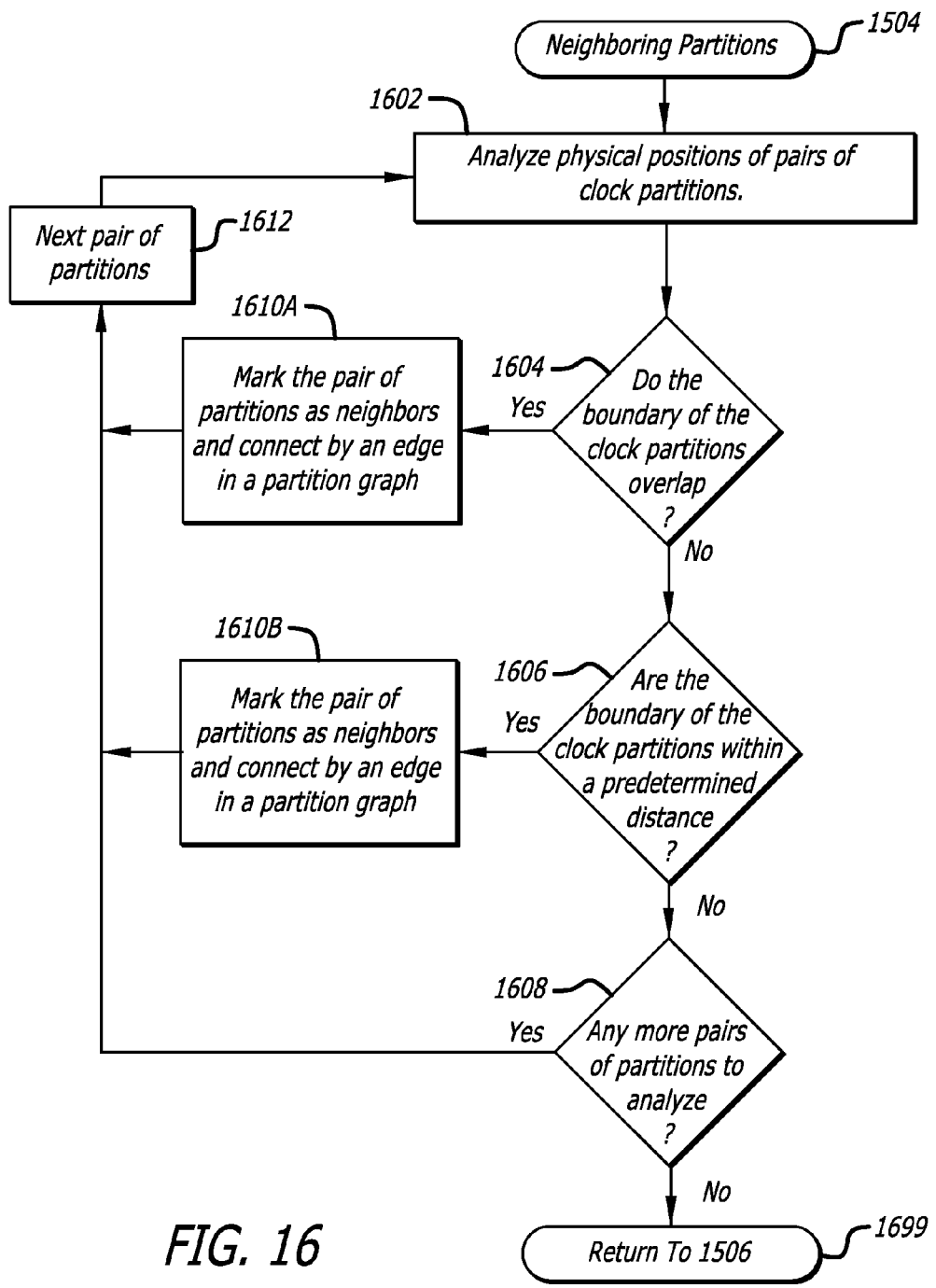

FIG. 16 is an exemplary method of automatically determining neighboring partitions within an integrated circuit.

FIG. 17 is a block diagram of an exemplary computer system.

DETAILED DESCRIPTION

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention include a method, apparatus and system for the automatic synthesis of the clock distribution network for application specific integrated circuits (ASICs) to minimize and control clock skew at sinks therein.

The embodiments of the invention provide a methodology for automated synthesis of clock distribution networks with low skew at the sinks by using distributed, dynamic de-skew circuits. A de-skew circuit is a circuit that uses feedback to align the arrival times of two or more signals.

Clock sinks (e.g., registers of circuits) are partitioned into local clock domains (also referred to as "clock partitions") based on the circuit's connectivity, timing and placement in embodiments of the invention. For each partition, a clock distribution network is synthesized using a clock tree synthesis tool such that it has a common root. The roots of the intra-partition clock networks are driven by variable delay buffers of clock de-skew circuits. A top-level clock tree distributes the clock signal from the clock source to the variable delay buffers of clock de-skew circuits. Arrival times of clock signals in adjacent partitions are compared using phase detectors. Within each partition, the de-skew circuit receives the results of the phase detectors at the boundaries with all neighboring partitions. A control algorithm designed into the clock de-skew circuit adjusts the variable delay buffer such that the clock skew between neighboring partitions is minimized. The control algorithm converges to a stable solution if its parameters meet a set of specific requirements.

In one embodiment of the invention, clock de-skew circuits are automatically synthesized with the clock tree in an ASIC by computer aided design software. In another embodiment of the invention, the clock de-skewing technology is applied to circuits with dynamic voltage and frequency scaling (DVFS).

Referring now to FIG. 1A, placement of a clock generator or clock source 102 and functional blocks (FB) 104A-104I in an integrated circuit 100 is illustrated. The interconnect wire 108 of the data paths and control paths has been globally routed between the functional blocks. The clock distribution network from the clock source 102 has yet to be synthesized and placed and routed.

Within the functional blocks, all the registers in the circuit are placed at this point in the design flow. A timing analysis has been performed and the timing slack at the inputs to the registers and other clocked logic is available as is other timing information.

A clock distribution network is synthesized that distributes the clock signals to all the registers in the circuit (whose positions and timing data are already known) to minimize skew.

In order to accomplish this, the registers of the circuit are partitioned based on their location, timing and connectivity information into clock partitions that may differ from partitions used in logic synthesis, placement and routing. Clock partitions may or may not overlap each another. The area on the chip defined by the convex hull (a "boundary") of the clock ports of all registers and other clock sinks is a clock partition. Two clock partitions are said to be "neighbors" if they have any common points or are separated by a distance below a threshold d, which is a design parameter for the method.

Referring momentarily to FIG. 1C, exemplary clock partitions 120A-120H have been formed in the chip 100.

After forming the clock partitions, the clock tree may be globally routed from a clock source 102 to the respective functional blocks 104A-104I by interconnect wiring 110 as illustrated in FIG. 1B.

Referring now to FIG. 1C, a simplified flat partitioning of the clock distribution network (referred to as clock partitioning) is illustrated using a map-style representation without any overlapping partitions. Within each partition, a clock distribution network is synthesized such as illustrated by wiring 112 illustrated in partition 102H illustrated in FIG. 1C. The wiring 112 within each partition may be a combination of tree wiring 112T and mesh wiring 112M.

The partitioning of the clock distribution network is done such that the maximum skew within the partition is bounded to a maximum skew design parameter l. The value of l sets a maximum limit on the area and the number of registers of each clock partition. A de-skew circuit 114 (e.g., a buffer with adjustable delay and a de-skew controller) is instantiated at the root of the clock network within each partition 120A-120H. Phase detectors 116 are placed at the boundaries of neighboring partitions to compare the local clocks from each of the respective networks. Partition 120D has phase detectors 116A, 116B, 116C at its boundaries with partitions 120E, 120H, 120C, respectively. The results of the comparisons performed by the phase detectors 116 are coupled to the de-skew circuit 114 of the respective compared partitions. For example, phase detector 116A at the boundary between partitions 120D and 120E compares the local clock for each partition and couples the result to the de-skew circuit 114 in each partition.

Referring now to FIG. 13, a schematic diagram of a slice of a clock distribution network 1300 is illustrated. The clock distribution network 1300 begins at the clock root 1301, also referred to herein as the clock (CLK) source. The clock distribution network 1300 includes global clock routing 1305 and local clock routing 1315 within each partition.

Global clock routing 1305 is the interconnect wiring from the clock root 1301 to each local root 1302 to each deskew circuit 114A-114B in each respective partition 202A-202B. There may be clock buffers (not shown in FIG. 13, see buffers B0-B2 in FIG. 2) inserted into the global clock routing 1305 between the clock root 1301 and the local root 1302 to compensate for impedance loading, such as from wire resistance and capacitance loading from gates receiving the clock and the wire routing.

The local clock routing 1315 is the clock routing of interconnect wires within each partition from the local root 1302 to the clock sinks (e.g., the clock input to register 1322). Thus, the local clock routing may also be referred to as intra-partition routing. The local clock routing 1315 may include a combination of tree wiring 112T and mesh wiring 112M within each partition as illustrated by the wiring 112 in FIG. 1C.

The clock distribution network 1300, including the global clock routing 1305, the local clock routing 1315 in each partition, the deskew circuits and the phase detectors 116, is synthesized so that local or intra-partition clock skew of the local clock routing 1315 within the boundaries of each partition is less than a maximum local skew design parameter l selected by an integrated circuit design engineer and the clock skew between neighboring partitions is less than a guard band design parameter g. The maximum local skew design parameter l and the guard band design parameter g are selected by an integrated circuit design engineer. The step size s of the deskew circuit may also be selected by an integrated circuit design engineer with the deskew circuit being synthesized to achieve the selected step size. Alternatively, the deskew circuit may be synthesized so that there are a range of values over which the sum of the step size s and maximum local skew is less than the guard band g. Static timing analysis or statistical static timing analysis may be used to verify that the inequality of Equation 1 below is met at the process corners.

Referring now to FIG. 2, a block diagram of a portion of an exemplary clock distribution network 200 is illustrated. Clock partitions 202A and 202B are illustrated with deskew circuitry and one clock sink (e.g., registers 204A-204B) each.

While a clock source may be initially buffered by the same clock buffer B0, different clock buffers B1, B2 and different impedance loads Z1,Z2 in the global clock routing may cause inter-partition clock skew when comparing the local clock signal CK1 and CK2 of the partitions 202A,202B. The local clock routing of the local clock signals CK1 and CK2 may also introduce inter-partition clock skew and intra-partition clock skew. The de-skew control circuits 114A,114B in the local clock network of each partition 202A,202B in the clock distribution network 200 may dynamically control inter-partition clock skew. The intra-partition clock skew is controlled by the partitioning of the clock partitions and the timing driven placement and routing of clock sinks.

Gating logic GL1 220A and GL2 220B, if any, may be used to gate the clock signal to respective registers R1 204A and/or R2 204B. Otherwise, the local clock signals CK1,CK2 are coupled into the clock input of the registers 204A,204B, respectively. The gating logic GL1 220A and GL2 220B is synthesized into the clock distribution network after the de-skew circuits 114A,114B near the respective registers 240A, 204B whose clock they are to gate. Gating logic control signals GLC1,GLC2 are coupled to the gating logic GL1 220A and GL2 220B to control the gating of the clock. The gating logic control signals GLC1,GLC2 may be coupled to the phase detector 116 to enable and disable the phase detector if the gated clocks GCK1,GCK2 are coupled into the phase detector. For example, if the gated clock GCK1 is coupled to the phase detector 116 instead of the ungated clock CK1 (as indicated by a dashed line in FIG. 2), the gating logic control signal GLC1 is coupled to the phase detector 116 (as indicated by a dashed line in FIG. 2). However if the ungated clock signal CK1 is coupled as the clock input into the phase detector 116 (indicated by the dotted line in FIG. 2), then the corresponding gating logic control signal (e.g., GLC1 indicated by the dashed line) is not needed to be coupled into the phase detector 116 to enable and disable it.

The phase detector 116 on or near the boundary between partitions 202A-202B receives the local clock signals CK1 and CK2 (or their gated equivalent versions) to make phase comparisons between each. FIG. 4A illustrates a block diagram of an exemplary phase detector 116.

The phase detector 116 at the boundary between partitions 202A-202B compares the two clock signals CK1 and CK2 sampled from the local clock network in each partition. The comparison is done using a guard band design parameter g. FIGS. 3A-3C illustrate the definition of the guard band design parameter g.

In FIG. 3A, when comparing the two clock signals CK1 and CK2, CK2 is considered to arrive "early" if it arrives before CK1 by more than the value of the guard band design parameter g. In FIG. 3B, CK2 is considered to arrive "late" if it arrives after CK1 by more the value of the guard band design parameter g. In FIG. 3C, if the difference of the arrival times of the two clocks is less than the value of the guard band design parameter g, then the skew between the two clocks is considered acceptable.

The deskew control circuits 114A,114B both receive the phase detector signal PDO1 from the phase detector 116 as illustrated. Each of the deskew control circuit 114A,114B may receive one or more phase detector signals PDO1-PDON to control the clock skew within their respective partitions. FIG. 5 illustrates a schematic block diagram of an exemplary deskew control circuit 114.

Generally, a de-skew control circuit 114 includes a variable delay buffer with an adjustable delay and control logic to adjust the delay. The delay of the variable delay buffer is adjustable in equal steps of a step size design parameter s. The control algorithm adjusts the delay of the variable delay buffer in response to signals from one or more phase detectors coupled to the respective partition.

Synthesis of De-Skewing Circuitry

A clock tree or clock wiring network of the clock distribution network is synthesized to distribute a clock from the global clock root or source to the de-skew controllers within each partition. The constraints of the clock tree of the clock distribution network may be relaxed because any asymmetry and skew introduced by it will be compensated by the de-skewing circuitry. The skew of the clock distribution network synthesized in this step determines the delay range of the buffers with adjustable delay within the de-skew controllers.

Clock partitioning may be performed in a straight-forward mesh-like fashion with the clock distribution network inside each partition considered to be ideal. This is equivalent to setting the maximum local skew design parameter l to zero. In a typical ASIC, it is substantially difficult to achieve an intra-partition local skew that is negligible or zero. However if the local skew is finite and can be bounded, distributed control algorithms may be used in the de-skew circuitry to reduce and minimize the clock skew in each partition relative to its neighboring partitions. Thus, clock partitioning may be performed using timing, placement and connectivity of circuits.

It has been determined that if the three design parameters of maximum local skew l, step size s, and guard band g satisfy the inequality of the sum of the maximum local skew l and step size s is less than the guard band, stated in equation form as $$l+s<g \qquad \text{(Equation 1)},$$

then the partitions settle to a state in which all phase detectors read both clocks to be less than the guard band g apart in a finite number of steps, provided that the variable delay buffers with adjustable delay have a sufficient delay range to accommodate such a solution. The integrated circuit is partitioned and each deskew circuit is synthesized to meet this design criteria. Achieving this state provides an indication that the de-skewing process will converge and that the maximum skew between two neighboring partitions should be no more than the guard band g.

Thus, the deskew circuitry is synthesized in each partition so that the sum of the maximum local skew l and step size s is less than the guard band in accordance with Equation 1. That is, the design of the de-skewing circuitry depends on the values of the three design parameters, maximum local skew l, step size s, and guard band g. For example, assume that the desired guard band g for the clock skew between neighboring partitions is selected to be 100 picoseconds (ps), and the desired maximum local skew within a partition is selected to be 40 ps for an ASIC implemented in a general purpose 90 nanometer (nm) CMOS process. In which case, the step size s of the deskew circuit may be designed to be 50 ps for example because the sum of 40 ps and 50 ps is less than 100 ps. Note that the selected maximum local skew within a partition may affect how the clock partitioning is performed on an integrated circuit and how the clock wiring is to be routed within a partition. The de-skew circuits may be synthesized using standard cells. If the timing of the de-skew circuitry is relaxed (e.g., greater than 10 ps), it may be synthesizable from scratch using ordinary NAND, NOR, INVERTER logic gates with a typical circuit synthesis tools.

The synthesized de-skew circuitry consists of two types of functional blocks that are instantiated in the clock distribution network on an integrated circuit. These are phase detectors 116 and de-skew controllers 114. The phase detectors 116 are placed between neighboring partitions and the de-skew controllers 114 are placed inside each partition at the local root 1302 of the clock root or clock source 1301. The details of each of these functional blocks is now more fully discussed.

Referring now to FIGS. 4A-4B, an exemplary implementation of a standard circuit cell for the phase detector 116 is illustrated.

The two input clocks from neighboring partitions CK1 and CK2 are coupled respectively into inputs S (sample clock input) 401 and R (reference clock input) 402 of the phase detector 116 to determine which one of the two input clocks is leading the other. If CK1 is leading CK2 (alternatively CK2 is lagging CK1), the phase detector signals that CK1 leads on its S_leads_R output 403. If CK2 is leading CK1 (alternatively CK1 is lagging CK2), the phase detector signals that CK2 leads on its R_leads_S output 404.

The phase detector 116 includes buffers 411A-411B, mutual exclusion elements 412A-412B, AND gate 414, buffer 416, D flip-flops 418A-418B, and an optional level shifter 420 coupled together as shown.

The buffers 411A-411B equally delay the two input clocks CK1 and CK2 by the time value of the selected guard band g. The delayed CK1 is coupled into the L input of the mutual exclusion element (Mutex2) 412B. The delayed CK2 output from the buffer 411B is coupled into the R input of the mutual exclusion element (Mutex1) 412A. The input clock CK1 is coupled into the L input of mutex1 412A for comparison with the delayed CK2. The input clock CK2 is coupled into the R input of mutex2 412B for comparison with the delayed CK1.

FIG. 4B illustrates an exemplary embodiment of a mutual exclusion (mutex) element 412 for instantiation as the mutual exclusion elements 412A-412B. A mutual exclusion element may also be referred to as an arbiter. Other implementations of an arbiter may be used in a phase detector.

The mutual exclusion element 412 has two inputs, a left L and right R, and two complementary outputs, L leads and R leads. The complementary outputs, L leads and R leads, indicate which one of the two inputs leads the other (i.e. which one arrives first). The mutual exclusion elements 412A-412B may include a flip flop formed by cross coupled NAND gates 450A-450B coupled to deglitch buffers formed by P-channel field effect transistors (PFETs) 451-452 and N-channel field effect transistors (NFETs) 453-454 coupled together as shown.

The L leads output of mutex 412A is coupled into the data input D of the D-flip flop 418A. The R leads output of mutex 412B is coupled into the data input D of the D-flip flop 418B.

The D flip-flops 418A-418B store the result of which one of the two input clocks CK1,CK2 leads the other. The D flip-flops 418A-418B are clocked by a self-timed circuit formed by the AND gate 414 with inputs coupled to the two input clocks CK1,CK2 and its output coupled to the buffer 416. The output of the buffer 416 is coupled to the clock inputs of the D flip-flops 418A-418B. The S_leads_R and R_leads_S outputs of the D flip-flops 418A-418B form one phase detector output (PDOi) that is coupled into the deskew controller circuit 114.

The logic levels on the S_leads_R and R_leads_S outputs form the one phase detector output (PDOi) to convey the status of two input clocks shown in FIGS. 3A-3B.

If S_leads_R output 403 from the phase detector 116 evaluates to logic zero for example (R_leads_S output 404 evaluates to logic one), it indicates that even when delayed by the guard band g the R input (CK2) 402 still arrives before S input (CK1) 401 as illustrated in FIG. 3A. Thus, the R input (CK2) may be too early as illustrated or the S input (CK1) may be too late.

If R_leads_S output 404 from the phase detector 116 evaluates to logic zero for example (S_leads_R output 403 evaluates to logic one), it indicates that that even when delayed by the guard band g the S input (CK1) 401 still arrives before R input (CK2) 402 as illustrated in FIG. 3B. Thus, the R input (CK2) may be too late as illustrated or the S input (CK1) may be too early.

If both the S_leads_R output 403 and the R_leads_S output 404 from the phase detector 116 evaluate to logical one, it indicates that the difference between the S input (CK1) 401 and the R input (CK2) is less than value of the guard band g as illustrated in FIG. 3C. In this case, the clock skew between CK1 and CK2 in neighboring partitions is less than the value of the guard-band g such that no further clock skew compensation may be needed.

Referring now to FIG. 5, an exemplary implementation of a circuit with standard cells for the de-skew control circuit 114 is illustrated. The de-skew control circuit 114 includes a variable delay buffer 550 and dynamic de-skew control logic 551 coupled together as illustrated.

The de-skew control circuit 114 receives a clock input CKin 501 and one or more phase detector outputs PD01-PD0N each of which includes an R_leads_S output 514A-514N and an S_leads_R output 513A-513N. The de-skew control circuit 114 generates a delay in the clock output CKout 502 from the clock input CKin equal to a multiple of the step size parameter s.

The variable delay buffer 550 is an adjustable delay element that may be formed simply of a delay line of identical buffers 511A-511N coupled in series together in a chain as shown with each having a delay value of the step size design parameter s. The input to each buffer 510A-510N and the output of buffer 510N, including each intermediate point of the delay line, may be coupled into the data inputs of a many-to-one multiplexer 512. If the input to the buffer 510A, CKin 501, is the selected signal to output from the multiplexer 512 the delay in CKin should be substantially minimized to the delay through the multiplexer 512.

The select input of the multiplexer 512 is coupled to a delay select control signal 521 of the dynamic de-skew control logic 551 for selecting the delay of the delay line of the buffers 510A-510N in the clock input CKin to be output onto the clock output CKout 502.

The dynamic de-skew control logic 551 generates the delay select control signal 521 in response to the one or more phase detection output signals PDO1-PDON. The dynamic de-skew control logic 551 implements a distributed control algorithm to keep the clock skew between neighboring partitions within the guard band g.

The dynamic de-skew control logic 551 includes a pair of multi-input NAND gates 515-516 coupled to a plurality of phase detection output signals PDO1-PDON, an exclusive-OR (XOR) gate 517, an up/down counter with saturation 520, a clock divider 506, and a delay block 507 coupled together as shown. The up/down counter with saturation 520 may also be referred to herein as a reversible digital counter with saturation.

The outputs of all the phase detectors connected to a current partition are gathered together using simple logic gates and then used to control the up/down counter with saturation 520.

The multi-input NAND gate 515 is coupled to a plurality of R_leads_S output signals 514A-514N from a plurality of phase detectors associated with a respective partition. The multi-input NAND gate 516 is coupled to a plurality of S_leads_R output signals 513A-513N from a plurality of phase detectors associated with the respective partition. The phase detectors may be associated by their geographic relationship such as being neighbors or by another means. The gates 515-517 generate an enable control signal EN coupled into the up/down counter 520 to enable it to count. The NAND gate 515 may generate an up/down count control signal coupled into the counter 520 to control the direction of the count, whether it is to count up or count down.

The controller 114 evaluates the outputs of the phase detectors 116 only every N clock cycles (e.g., N=8) to ensure that any change in the delay of the adjustable delay element propagates all the way to the local clock network and the phase detectors before the next evaluation. The clock divider 506 and the delay element 507 driving the clock input of the counter 520 accomplish this task.

The up/down counter with saturation 520 counts until it reaches the saturation points of a maximum value or a minimum value. The maximum value is typically limited by the number of bits in the counter. The number of bits in the counter 520 is one consideration during the deskew circuit synthesis process. For example, if the counter is a four bit counter then the maximum value is typically a count of fifteen. The minimum value is typically a count of zero. Once a saturation point is reached, the counter will not roll over. Instead it waits to count back within the range of count values between saturation points of the up/down counter. Thus, the count value of the counter 520 may not experience wide variations so that the step size in the delay of CKin is smoothly selected by the multiplexer 512. Moreover, the up/down counter with saturation 520 provides monontonicity in the delay of the clock and a more appropriate clock operation.

The clock divider 506 may received the same clock input CKin coupled to the delay line or optionally may be connected elsewhere within the partition to a similar but slightly different clock input CKin' 501'. The clock divider divides down the clock so that the phase detector outputs PD01-PD0N are evaluated every N clock cycles. Delay element 507 assures that the proper control signals are available to the counter 520 before it is clocked.

The up/down counter 520 generates the delay select control signals 521 coupled to the multiplexer 512 which select how much delay should be inserted into the clock output signal CKout from the clock input signal CKin to compensate for clock skew from neighboring clock signals.

For example, consider that CKin in one deskew circuit is CK2 and that CK2 leads CK1 generating an R_leads_S output signal (e.g. a logic zero) with an S_leads_R output signal (e.g., a logic one) indicating so. In this case, the NAND gate 515 indicates to the counter 520 to count up to select a greater delay at the multiplexer 512 so as to delay CK2 by another step s to reduce the clock skew between CK2 and CK1. The output of NAND gate 515 may be a logic zero if all the S_leads_R output signals 513A-513N are a logic one so that the XOR gate 517 generates the enable signal EN for the counter 520. If a different phase detector indicates that the S_leads_R output by a logic zero both the outputs of NAND gates 515-516 would be logic high so that the XOR gate 517 would not generate the enable signal EN to allow the counter 520 to count. However, in another deskew circuit with neighboring partition local clock CK1 as CKin, the deskew circuit may compensate CK1 instead in order to eliminate the skew between CK1 and CK2. It may be the case that both of the deskew circuits in neighboring partitions compensate for the clock skew between CK1 and CK2.

Note that if the number of neighbors of a partition increases, a very small increase in the complexity of the control logic block 551 incurs. While the NAND gates 515-516 coupled to the outputs of phase detectors have M inputs, where M is the number of neighbors, other components in the circuit are independent of the number of neighboring partitions. Moreover, the timing constraints of the gates 515-517 are very relaxed, such that these gates can be implemented in the most economical way to save power and area.

Neighboring Partitions for Phase Detector Placement

In order to synthesize the distributed clock de-skewing circuitry, the registers of the circuit (i.e., the clock sinks) may be partitioned based on their location, connectivity and timing information as is described further herein. A partition graph may be generated to represent the neighboring relationships between the partitions to determine placement of phase detectors.

Referring to FIG. 6A an exemplary partition of clock sinks on an integrated circuit 600 into partitions 601-604 is illustrated. Each partition has a corresponding partition boundary indicated by dashed lines. The exemplary partition illustrates four clock partitions 601-604 for one clock source of the integrated circuit 600. Oftentimes an integrated circuit has a plurality of different clock sources, such as a four phase clock having a phase one clock, a phase two clock, phase three clock, and a phase four clock, for example. Different partitions and partition graphs may be generated for the different clock sources. A method of partitioning is described herein in a different section.

In the partitioning of integrated circuit 600, the dots represent the physical placement of clock pins of the clock sinks (e.g., registers) in the integrated circuit layout. Similar shading of the dots indicates clock sinks (e.g., registers) that have been assigned to the same partition. Conversely, different shading of the dots signifies clock sinks (e.g., registers) that have been assigned to different partitions. Clock sinks 601A-601H have been assigned to partition 601. Clock sinks 602A-602H have been assigned to partition 602. Clock sinks 603A-603G have been assigned to partition 603. Clock sinks 604A-604G have been assigned to partition 604.

For each partition, a corresponding "physical boundary" corresponds to an area on the integrated circuit chip layout defined by the convex hull of the position of the clock sinks in each partition. In FIG. 6A, the physical boundaries of each of the partitions 601-604 are shown with dashed lines.

For the synthesis of deskew circuitry, neighboring partitions may be defined for the purpose of placement of phase detectors on or near their physical boundaries and comparison of their local clocks in accordance with the following rules:

Two partitions are neighbors if the corresponding physical boundaries of the partitions overlap. For example in FIG. 6, the physical boundaries of partitions 601 and 602 overlap on the integrated circuit 600 so that they are neighboring partitions for the purpose of placement of a phase detector near their boundaries and comparison of their local clocks. The boundaries of partitions 601 and 604 overlap on the integrated circuit 600 so that they are also considered to be neighboring partitions.

Two partitions are neighbors, even though their corresponding physical boundaries do not overlap, if their physical boundaries are separated by a distance that is less than or equal to a neighboring distance design parameter d. Accordingly, two partitions are not neighbors if their physical boundaries do not overlap and are separated by a distance that is greater than the neighboring distance design parameter d.

For example, the physical boundaries of partitions 602, 603, and 604 do not overlap on the integrated circuit layout 600. However, a minimum separation distance 605 between partitions 602 and 603 is less than a neighboring distance design parameter d. Thus, partitions 602 and 603 would be considered to be neighboring partitions for the purpose of placement of a phase detector near their boundaries and comparison of their local clocks. A minimum separation distance 606 between partitions 602 and 604 is greater than the neighboring distance design parameter d. Thus, partitions 602 and 604 would not be considered to be neighboring partitions and thus no phase detector may be placed near their boundaries and no comparison may be made of their local clocks based on physical location. However, timing and connectivity considerations may consider partitions 602 and 604 to be considered invalid partitions with the clock sinks therein requiring a re-partitioning into neighboring partitions.

Referring now to FIG. 6B, an exemplary partition graph 650 corresponding to the partitioning of the clock sinks in the integrated circuit 600 is illustrated to show neighboring relationships between partitions of an exemplary partitioning of clock sinks. In FIG. 6B, squares 601-604 represent the corresponding partitions of clock sinks shown in FIG. 6A. The edges 651-653 represent the neighboring partitions where phase detectors may be placed to minimize clock skew.

As discussed previously, partitions 601 and 602 on the integrated circuit 600 are neighboring partitions that is indicated by edge 652 in the partition graph 650. Partitions 602 and 603 are neighboring partitions and is indicated by edge 651 in the partition graph 650. Partitions 601 and 604 on the integrated circuit 600 are also considered to be neighboring partitions which is indicated by edge 653 on the partition graph 650. In contrast, partitions 602 and 604 are not neighboring partitions. Thus, there is no edge between partitions 602 and 604 in the partition graph 650.

Each edge of the partition graph indicates that a phase detector is to be placed on or near the boundaries of the partitions at the ends of each edge. Additionally, each edge indicates a minimal skew clock path for placement of source registers and destination registers for critical data paths to minimize clock skew. For example, consider a data path with a source register initially placed as a clock sink in clock partition 604 and a destination register initially placed as a clock sink in clock partition 603 even though the data path differs. The amount of accumulated skew may be determined from the partition graph 650. The accumulated clock skew path begins in partition 604, traverses edge 653, partition 601, edge 652, partition 602, edge 651, and finally partition 603 along the partition graph 650. To minimize clock skew between the clocks at the respective source and destination registers of the data path, the partitioning may be re-evaluated with the source register and destination register being placed in closer partitions with fewer partition boundaries to cross. For example, the source register may be re-placed on the integrated circuit so that it resides in clock partition 602, a neighboring partition of partition 603, so that the skew between clocks in each is less than the guard band design parameter g. Re-evaluating placements of source and data registers may better avoid a race condition between the data, sent by the clock at the source register, and a skewed clock at the destination register if the data path is critical with minimal timing slack.

Partitioning

As has been previously mentioned herein, the clock sinks (e.g., registers) of a circuit may be partitioned based on their location, connectivity and timing information in order to synthesize a distributed clock network with the distributed clock de-skewing circuitry.

In order to be valid, the partitioning in a partition graph satisfies the following three requirements:

1) A distance between clock sinks inside each partition is such that a worst case skew of an intra-partition clock distribution network is less than or equal to the maximum local skew design parameter l. Timing driven placement and routing software or clock tree synthesis software may be used to generate such an intra-partition clock distribution network and assure that the worst case clock slew to clock sinks within a partition is not greater than the maximum local skew design parameter l. A user may also manually layout an intra-partition clock distribution network and use software to verify the worst case clock slew to clock sinks within a partition is not greater than the maximum local skew design parameter l.

This constraint effectively limits the size of each partition. In a first order model, the maximum clock skew between two points is proportional to the Manhattan distance between the two points. If the maximum local skew design parameter l corresponds to a Manhattan distance of L, then the maximum size of a partition is a square rotated from the chip grid having a diagonal distance between corners equal to L and its sides at 45 degrees angles from the chip grid points.

2) The number of clock sinks in each partition is bounded to be less than or equal to a maximum clocks sink number design parameter $C_{max}$. If more clock sinks are instantiated in a partition over the maximum clocks sink design parameter $C_{max}$, more clock buffers are needed which increases the insertion delay in the clock tree path and results in increased clock skew.

3) The timing slack in critical data paths with source and destination registers in different partitions should be sufficient to avoid setup time violations and race conditions between clock and data signals at the destination register. In one embodiment of the invention, the timing slack is greater than or equal to the sum of the guard band g and maximum local skew parameter l, multiplied by the number N of different partition boundaries crossed along a clock skew path between source and destination clock sinks in a partition graph, added to the value of the maximum local skew l. This inequality can be represented in equation form as:

$$slack \geq (g+l)*N+l = gN+l(1+N)$$

where g is the guard band, l is the maximum local or intra-partition clock skew, and N is the number of different arcs (or edges in the partition graph) crossed over in the clock skew path between the source partition and the destination partition in the partition graph. The timing slack value can be determined by a static timing analysis using timing analysis software. The timing slack requirement is to avoid setup time violations and race conditions between data signals crossing over different partitions boundaries and a local clock signal. With distributed de-skewing, the partitions effectively have a skew of no more than g between them at their boundaries. However when a data path has source and destination registers in partitions with a clock skew path crossing over multiple partition boundaries, clock skew can accumulate at a rate of l+g per partition (g at the boundary and l inside the partition).

This third constraint, regarding timing slack, reflects the influence of timing and connectivity on the partitioning of clock sinks. For instance, it may be preferable to place and partition the clock sinks in an integrated circuit so that the clock skew path in the partition graph cross the fewest number of partition boundaries as possible for a plurality of the most critical data paths.

Referring now to FIG. 7, a physical partition 700 is illustrated with a critical path 701 having two endpoints, a source point 702S and a destination point 702D, near their respective clock sinks (not shown). A critical path is a data path with a low level of slack timing. The physical partition 700 includes three neighboring partitions 711-713 each with a boundary illustrated by a dashed line. The partitions 711-713 may be elongated along a line 705 between the endpoints 702S, 702D as shown with the longest dimension as close as possible to L (measured Manhattan distance). Recall that the maximum local skew design parameter l may correspond to the Manhattan distance L.

In the partitioning 700, a clock skew path 705 from the source point 702S to the destination point 702D accumulates clock skew as follows: a first maximum local clock skew l within partition 711, a guard band g of clock skew crossing from partition 711 to 712, a maximum local clock skew l within partition 712, a guard band g of clock skew crossing from partition 712 to 713, and a maximum local clock skew l within partition 713. Thus, the accumulated clock skew for the data path 701 is 3l+2g. Note that the clock skew path 705 crosses two different partition boundaries of partitions 712 and 713, other than the boundary of partition 711 that includes the source point 702S. To use the equation, the number of partitions crossed over in the clock skew path between the source partition 711 and the destination partition 713 in the exemplary partitioning 700 is three. However, in a corresponding partition graph (FIG. 6B shows an exemplary partitioning graph 650), there would be only two edges that are crossed so that the number of boundaries crossed N is only two. Hence, the timing slack in critical path 701 should be at least l+2*(g+l)=3l+2g for the critical data path 701 if the three partitions 711-713 are to be valid partitions. Otherwise, the source point and/or the destination point 702D with their respective clock sinks may need to be placed in the same or closer partition, such as in the same partition 711 so that its clock skew path has less skew to better match the available slack to provide a valid partitioning.

Timing-driven placement of clock sinks in the partitions is beneficial to minimizing clock skew in synthesizing a clock distribution network. A bad placement can result in critical data paths having endpoints in different partitions with a clock skew path in a partition graph that traverses other partitions. With endpoints in partitions that are far apart in the partition graph, clock skew can potentially accumulate as partition boundaries are crossed, ultimately reducing design margins and circuit performance. A good placement will take timing into account, placing the endpoints of critical paths as close to each other as possible in the partition graph.

As mentioned previously, timing slack in a data path can be readily determined by timing analysis software. In determining the minimum amount of timing slack in critical data paths to clock sinks, such as registers/flip-flops, setup (late) timing slack and hold (early) timing slack can differ and a timing analysis software tool may compute some, all or just provide a slack with the worst case value–the least.

The timing analysis tool computes the late arrival time for the rising signal $a_R^{late}$ (i) and the falling signal $a_F^{late}$ (i) for the case that the delay arc is non-inverting according to the following formula:

$$a_R^{late}(j) = \max_{(i,j) delay\ arc}\{a_R^{late}(i) + d^{RR}_{ij}\}$$

and $$a_F^{late}(j) = \max_{(i,j) delay\ arc}\{a_F^{late}(i) + d^{FF}_{ij}\}$$

Here $d^{RR}_{ij}$ is the delay of the delay arc from pin i to pin j. In the case the delay arc is inverting (for example the delay arc of an inverter), the arrival times are computed as follows:

$$a_R^{late}(j) = \max_{(i,j) delay\ arc}\{a_F^{late}(i) + d^{FR}_{ij}\}$$

and $$a_F^{late}(j) = \max_{(i,j) delay\ arc}\{a_R^{late}(i) + d^{RF}_{ij}\}$$

The timing analysis tool computes the early arrival time for the rising signal $a^{early}$ (i) and the falling signal $a_F^{early}$ (i) for the case that the delay arc is non-inverting according to the following formula:

$$a_R^{early}(j) = \min_{(i,j) delay\ arc}\{a_R^{early}(i) + d^{RR}_{ij}\}$$

and $$a_F^{early}(j) = \min_{(i,j) delay\ arc}\{a_F^{early}(i) + d^{FF}_{ij}\}$$

and in the case of an inverting delay the arrival times are computed similarly.

Setup (late) timing slack $setup^{RR}_{ij}$ for a rising input (logic one) may be determined by timing analysis software using the following equation:

$$a_R^{late}(i) + setup^{RR}_{ij} - T + slack^{RR}_{ij} \leq a_R^{early}(j)$$

Setup (late) timing slack $slack^{FR}_{ij}$ for a falling input (logic zero) may be determined by timing analysis software using the following equation:

$$a_F^{late}(i) + setup^{FR}_{ij} - T + slack^{FR}_{ij} \leq a_R^{early}(j)$$

In the foregoing two equations, the variables $a_R^{late}$ (i) and $a_F^{late}$ (i) are the late arrival times of the rising and respectively falling data signal at the data input of a register. T is the clock period. The variables $setup^{RR}_{ij}$ and $setup^{FR}_{ij}$ are the minimum setup time requirements for the register/flip-flop for rising and falling inputs respectively. The variable $a_R^{early}$ (j) is the early arrival times of a rising clock signal at the receiving register.

Usually, setup timing slack is more critical than hold timing slack because hold timing violations can be easily resolved by adding data buffers ("hold buffers") in the data path to provide additional delay and increase hold time at a register. However, one objective of synthesis is to conserve area by minimizing the number of hold buffers added. Thus, it is useful to consider the hold timing slack as a second criterion in the partitioning.

Hold (early) timing slack hold$^{RR}_{ij}$ for a rising input (logic one) may be determined using the following equation:

$$a_R^{early}(i) + \text{hold}^{RR}_{ij} + \text{slack}^{RR}_{ij} \geq a_R^{late}(j)$$

Hold (early) timing slack hold$^{FR}_{ij}$ for a falling input (logic zero) may be determined using the following equation:

$$a_F^{early}(i) + \text{hold}^{FR}_{ij} + \text{slack}^{FR}_{ij} \geq a_R^{late}(j)$$

In the foregoing two equations, the variables $a_R^{early}$ (i) and $a_F^{early}$ (i) are the early arrival times of data at the source point of a data path. The variables hold$^{RR}_{ij}$ and hold$^{FR}_{ij}$ are the minimum hold time requirements for the register/flip-flop for rising and falling inputs respectively. The variable $a_R^{late}$ (j) is the late arrival times of the rising clock signal at the receiving register, the data input of a register/flip-flop, for rising and falling inputs respectively.

The foregoing rules and the determination of slack values by a timing simulator for a plurality of critical paths may be used in partitioning the clock sinks of an integrated circuit into respective clock partitions, such as shown in FIG. 6A for example.

A timing graph for the netlist of the integrated circuit may assist in determining timing slack and partitioning the clock sinks into the clock partitions.

Referring now to FIG. 14A, a schematic diagram of an exemplary circuit 1400 is illustrated. The circuit includes flip flops FF1-FF4 and gates W-Z coupled together as shown. The timing delays in the circuit are indicated above the gates and flip-flops as well as above the interconnect wires. For use by a computer, it is preferable to have a timing graph annotated with timing delays.

Referring now to FIG. 14B, a timing graph 1401 of the exemplary circuit 1400 is illustrated. The timing delays in the timing graph are indicated above the vertices for the gates and above the edges for the interconnect wires. The timing graph 1401 may be used to compute the maximum arrival times at the input to the flip-flop FF4 in order to determine the slack that is available along the various data paths from FF1 to FF4, FF2 to FF4, and FF3 to FF4. With this timing and connectivity information, a determination may be made with regards to the placement of the flip-flops FF1 through FF4 in clock partitions to minimize clock skew. A plurality of critical data paths are evaluated having minimal timing slack and thus may need to be placed in the same or neighboring partitions. Alternatively, the timing graph may be evaluated so that clock sinks may be placed farther apart along a clock skew path as sufficient slack is available. Alternatively, clock sinks may be pruned along with edges in the partition graph to eliminate gates and thereby conserve area and power consumption.

For example, it may be determined that the data path from FF1 to FF4 has a timing slack of 56 picoseconds (ps) and the data path from FF3 to FF4 is critical having a timing slack of only 10 ps. This may require that flip flops FF3 and FF4 be placed in the same partition while the placement of FF1 and FF4 are placed in neighboring partitions. In another example, it may be determined that the data path from FF1 to FF4 has a timing slack of 300 picoseconds (ps) and the data path from FF3 to FF4 is critical having a timing slack of only 10 ps. If flip flops FF1 and FF4 are initially in the same partition, they can be repartitioned into different partitions if the timing slack is sufficiently large while the placement of FF1 and FF4 may be in the same partition.

Useful Clock Skew and Post Optimization

In addition to using circuits to de-skew clocks of unintentional clock skew, useful clock skew may be intentionally inserted, such as to increase the setup slack at a destination register for example. Useful clock skew is intentional clock skew and is not a parasitic effect. The delay of the local clock in the local clock routing within a partition can be adjusted in order to improve the timing slack.

A determination may be made if useful skew may be added into clock paths. Prior to partitioning the clock sinks into the clock partitions, clock latencies are computed with the goal that every combinational path with length greater than kL (where k is an integer number) has a timing slack of at least l+k (g+l). After the partitioning step the clock latencies can be recomputed with the added useful skew such that the slack of every combinational path is at least l+N (g+l), where N is the length of the shortest path between the source partition and destination partition in the partition graph.

Useful skew may be introduced into a circuit in a couple of different ways to assist the setup time in a critical data path. Consider for example, the critical data path 1320 between source register 1321 and destination register 1322 illustrated in FIG. 13 for example. The intra-partition or local clock CK2 of partition 202B may have useful skew added to it by adding a useful skew buffer 1350 of known timing delay between the output of the buffer 114A generating the local clock CK1 and the phase detector 116. This delays the CK1 input to the phase detector so that the deskew circuit 114B will compensate and introduce useful skew into the local clock CK2. Alternatively, a useful skew buffer 1351 of known timing delay may be coupled between the output of the buffer 114B generating the local clock CK2 and the clock input of the destination register 1322 to introduce useful skew.

The clock partitioning of an integrated circuit may undergo post-optimization by re-evaluation of the initial partition graph. One or more of the edges in the partitioning graph may be removed so the partitions are no longer neighbors, provided that the timing constraints of data paths in an integrated circuit are met. An edge is removed if its removal will not increase clock skew. Each edge in the partitioning graph corresponds to a phase detector. While the deskew control circuit remains, eliminating an edge in the partitioning graph may eliminate at least one phase detector as the partitions are no longer neighbors. As the number of phase detectors is reduced, the amount of control logic in the de-skew circuit is also reduced. Thus, eliminating edges in the partition graph reduces the placement and routing of phase detectors of the deskew circuitry such that chip die area and power are conserved.

Clock Distribution Network Synthesis Tool

Referring now to FIG. 8, a block diagram of a clock distribution network synthesis tool 800 is illustrated. The clock distribution network synthesis tool 800 receives a netlist of the integrated circuit, a technology library including standard cells for the deskew circuitry, a partial circuit layout with functional blocks placed and logically routed, and timing information from a timing analysis.

The clock distribution network synthesis tool 800 includes a clock tree synthesizer 802, a clock network placer and router 804, and a clock deskew synthesizer 806 in communication with each other to generate an updated netlist including the logical instances of the clock network and an updated circuit layout including the layout of the clock network. The clock distribution network synthesis tool 800 may further include a user interface 803 in communication with the other functional blocks of thereof so as to receive clock skew design parameters if they are not included in the technology library or other design file.

The clock distribution network synthesis tool 800 and its software modules including the clock tree synthesizer 802, the clock network placer and router 804, and the clock deskew synthesizer 806 are stored in a processor readable storage medium and executed by one or more processors to automatically perform elements of the methods described herein.

Methods of Synthesis of a Clock Distribution Network

Referring now to FIG. 9, a flow chart of a method of designing an integrated circuit is illustrated.

At block 902 in the design flow, a high level circuit description of the integrated circuit is initially received.

At block 904 in the design flow, circuit logic is synthesized and mapped to a technology library.

At block 906 in the design flow, the circuit logic of functional blocks is placed into a preliminary layout design of the integrated circuit.

At block 908 in the design flow, the interconnect wires between functional blocks in the layout design are globally routed. Detailed routing of the interconnect wires to the functional logic within the functional blocks may also be performed to improve the accuracy of the synthesis of the deskew circuitry, although it is not necessary.

At block 910 in the design flow, the timing of the preliminary layout of the integrated circuit including the circuit logic is analyzed to determine timing information.

At block 912 in the design flow, the clock distribution network for the integrated circuit is synthesized. The clock distribution network includes instantiation of the deskew circuitry for each clock partition of the integrated circuit.

Referring now to FIG. 10, a flow chart of a method of synthesizing a clock distribution network of the integrated circuit is illustrated.

At block 1002 of the design flow, the clock sinks in the integrated circuit are automatically partitioned by software into a plurality of partitions for each clock network. A clock sink is a flip flop or a register with a clock input terminal. Each partition may be referred to as a clock partition herein.

In one embodiment of the invention, the partitioning of clock sinks is in response to signal connectivity and signal timing along critical data paths. If there is sufficient slack along a critical data path greater than the guard band, a clock sink associated therewith may be partitioned into a neighboring partition. In another embodiment of the invention, the partitioning of clock sinks is in response to the physical placement of the clock sinks. In another embodiment of the invention, the automatic partitioning of clock sinks includes positioning partitions near each other to minimize a number of partitions over which a critical signal path crosses. In another embodiment of the invention, automatic partitioning of clock sinks is performed hierarchically including one level of the hierarchy of the clock partitions including boundaries of various voltage islands. FIGS. 15-16 illustrate an exemplary method of partitioning the clock sinks of an integrated circuit and are described below.

At block 1004 of the design flow, an intra-partition clock network is synthesized within each of the partitions such that it has a single local root and the local clock skew within each partition is less than or equal to a value of a maximum local clock skew design parameter l. For example, the value of the maximum local clock skew design parameter l may be fifty picoseconds.

At block 1006 of the design flow, clock deskew circuitry is synthesized, placed, and routed to control clock skew in each of the plurality of partitions for each clock source. The clock de-skew circuitry is coupled between the master clock generator and the clock sinks in each partition. One clock deskew control circuit is synthesized into each of the plurality of partitions at the root of the intra-partition clock network thereof. Phase detectors are synthesized and placed between the local clock signals of neighboring partitions.

In one embodiment of the invention, the clock de-skew circuitry is synthesized into each of the plurality of partitions with a clock control step size s less than the sum of the maximum local clock skew l and a guard band level g.

At block 1008 of the design flow, a global clock network from the master clock source to the clock deskew circuitry is synthesized so that that clock skew of the global clock network is within the delay adjusting range of the deskew circuitry. The global clock network couples to each deskew control circuit within each of the plurality of partitions.

Note that the order of the blocks 1004, 1006, and 1008 may be altered in the design flow such that block 1006 is performed with blocks 1004 and 1008 being combined and performed thereafter to complete the clock network. In another embodiment of the invention, blocks 1004 and 1008 are combined together and performed prior to performing the element of block 1006.

Referring now to FIG. 15, an exemplary method of automatically partitioning clock sinks 1002 is illustrated and now described.

At block 1502, a predetermined number of clock sinks are selected in the integrated circuit within a predetermined distance of each other for each respective partition. The predetermined number of clock sinks is less than or equal to the maximum clocks sink number design parameter $C_{max}$. This limits the maximum number of clock sinks within a partition. The predetermined distance is proportional to the maximum local skew design parameter l. In one embodiment of the invention, the maximum local skew design parameter l corresponds to a Manhattan distance, This predetermined distance between clock sinks is to maintain a clock skew of less than the maximum local skew design parameter l within each partition.

At block 1504, clock partitions of the plurality of clock partitions are evaluated to determine neighboring partitions. This is to assist in the placement of phase detectors between neighboring partitions. FIG. 15 illustrates an exemplary method of determining the neighboring partitions within an integrated circuit and is described herein.

At block 1506, a partition graph may be formed of the plurality of partitions. This indicates neighboring partitions by edges in the graph and facilitates evaluating clock skew for critical data paths to avoid race conditions.

At block 1508, the integrated circuit is analyzed using a timing analysis tool and the timing slack for a plurality of critical data paths is determined.

At block 1510, a determination is made as to whether or not the partitioning is valid. If the slack of a critical data path is insufficient, the clock skew between source clock sink and destination clock sink should be decreased by re-partitioning. If so, the method goes back to block 1502 as indicated by the return path. If the partitioning is valid, the method can return to block 1004 of FIG. 10.

Referring now to FIG. 16, an exemplary method of automatically determining the neighboring partitions 1504 within an integrated circuit is illustrated and now described.

At block 1602, the physical positions of pairs of clock partitions are analyzed.

At block 1604, each pair of clock partitions is analyzed to determine if the boundary of the clock partitions overlap. If not, the method goes to block 1606 for a further determination. If the boundaries of a pair of clock partitions overlap, the method goes to block 1610A.

At block 1606, a determination is made if the boundary of pairs of clock partitions are within a predetermined distance between each. In one embodiment of the invention, the predetermined distance is a neighboring distance design parameter d. If the boundary of pairs of clock partitions are within the predetermined distance, the method goes to block 1610B. If not, the method goes to block 1608.

At block 1608, a determination is made if there are any more pairs of partitions to analyze. If so, the method goes to block 1612. If not, the method goes to block 1699 and the method returns back to 1506 in FIG. 15.

At blocks 1610A and 1610B, one pair of partitions are marked as being neighbors and connected by an edge in the partition graph. The method then goes to block 1612.

At block 1612, a next pair of partitions is selected for analysis. The method then goes to block 1602

Hierarchical Clock Partitioning

While the previous discussion has assumed a flat or top level clock partitioning, a hierarchical clock partitioning may be used instead.

Referring now to FIG. 11, a diagram illustrating hierarchical clock partitioning for the synthesis of the clock distribution network with dynamic clock de-skewing circuit synthesis is illustrated. Below a top chip level, the sinks in the clock distribution network may be partitioned into multiple hierarchical levels. While FIG. 11 only illustrates three levels of portioning, it is understood that more or less partitioning levels may be used in a hierarchical fashion.

As illustrated in FIG. 11, the sinks in the clock distribution network may be partitioned into a plurality of clock partitions CPL1A through CPL1L at a first level (level one). The sinks in each of the first level partitions (e.g., CPL1B) may be further partitioned into one or more clock partitions CPL2A through CPL2M at a second level (level two). The sinks in each of the second level partitions (e.g., CPL2A) may be further partitioned into one or more clock partitions CPL3A through CPL3N at a third level (level three).

At each level of the hierarchical clock partition, the clock de-skewing algorithm is applied using the same design parameters or constraints for step size s, guard band g, and maximum skew l, such as for the clock partitions CPL2A through CPL2M in level two. However different parameters or constraints for step size s, guard band g, and maximum skew l may be used at the different levels. For example, the algorithms for de-skewing the lower level partitions may use different values for the main design parameters (l, s, g) than the chip-level de-skewing algorithm. Typically the guard band g is more generous at higher levels of hierarchy so that the step size may be larger and the de-skewing circuit that is synthesized may differ at each level. As long as the condition of Equation 1 is met at each level, a hierarchical chip-wide de-skewing scheme should converge.

Referring now to FIG. 12, a block diagram of an integrated circuit 1200 is illustrated with an exemplary two level hierarchical clock partition for one clock source. If multiphase clock signals or other clocks are routed through the integrated circuit a different hierarchical clock partition may be made for each different clock signal.

In FIG. 12, the chip level 1200 includes four level one clock partitions 1201A-1201D. Each level one partition may have two or more level two clock partitions 1220A-1220H. The level one partition 1201B is exemplary of how the level one partitions may be hierarchically partitioned into a plurality of level two clock partitions 1220A-1220H.

A clock source 102 couples a clock signal to a level one deskew controller circuit 1214 in each of the four level one clock partitions 1201A-1201D. Level one phase detectors 1216 on the border of neighboring level one clock partitions compares a pair of local clocks in each of the neighboring level one clock partitions. The deskew controller circuit 1214 and the phase detectors 1216 may be instantiations of the respective circuits 114 and 116 shown and described previously.

The buffered clock signal generated by the level one deskew control circuit 1214 is distributed to level two deskew control circuits 1224 in each of the level two clock partitions 1220A-1220H. Level two phase detectors 1226 on the boarder of neighboring level two clock partitions compares a pair of local clocks in each of the neighboring level two clock partitions. For example, phase detectors 1226A-1226C on the border of the level two clock partition 1220D with its neighbors, respectively compare the local clock of the level two clock partition 1220D with the local clock within the level two clock partitions 1220E, 1220H, 1220C, respectively. The phase detection output signals are coupled into the level two deskew circuits 1224 to generate a local clock within each partition with less clock skew in comparison with the neighboring local clock. The deskew controller circuit 1224 and the phase detectors 1226 may be instantiations of the respective circuits 114 and 116 shown and described previously.

Dynamic Voltage and Frequency Scaling Circuits

While the clock de-skewing circuitry is generally applicable to de-skewing local clocks, it also may be synthesized in circuits using dynamic voltage and frequency scaling (DVFS).

In a circuit supporting DVFS, two blocks A and B may operate in many different combinations of power supply voltages due to dynamic voltage control. For example, the voltage to the circuits in block B may be reduced to lower power consumption. If the clock skew is minimized by design for one particular voltage combination using the traditional approach (for example the power supply for block A Vdd(A) may be equal to the power supply of block B Vdd(B)), then the skew is not controlled in other voltage combinations. For example if Vdd(A)>Vdd(B), the buffers located inside the voltage island corresponding to block A will have a smaller insertion delay, thus destroying the original skew arrangement. In embodiments of the invention, the clocks are dynamically de-skewed as the supply voltages of the voltage islands change. A voltage island is group of circuits and/or functional blocks with similar power supply characteristics that may differ from other power supply characteristics of other voltage islands. Data communications across voltage island boundaries should be reliable.

The partitioning of the circuit for de-skewing purposes is performed hierarchically with the boundaries of the various voltage islands forming one level of the hierarchy. Hierarchical partitioning was discussed herein with reference to FIGS. 11-12.

Referring to FIG. 4A, the phase detector circuit 116 is slightly modified to support DVFS. The phase detector 116 includes at least one level shifter or level-converter 420 to adapt the logic levels of the signals on the S input 401 from a first power supply voltage DVDD to a second power supply voltage SVDD. The second power supply voltage matches the voltage supplied to other circuits of the phase detector 116.

Referring to FIG. 5, the deskew control circuit 114 may also be slightly modified to support DVFS. The adjustable delay range of the chain of buffers 510A-510N is synthesized to compensate for delay variations caused by the dynamically controlled supply voltage. That is, the adjustable delay range of the delay line formed of the buffers 510A-510N may need to be increased to be able to compensate for additional skew caused by the dynamically controlled power supply voltage.

Computer System

Referring now to FIG. 17, a computing system 1700 is illustrated that may be used to perform some or all of the processes in accordance with a number of embodiments of the invention. In one embodiment of the invention, the computing system 1700 includes a processor 1710, a memory 1720, a removable media drive 1730, and a hard disk drive 1740. In one embodiment, the processor 1710 executes instructions residing on a machine-readable medium, such as the hard disk drive 1740, a removable medium 1701 (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 1720, which may include Random Access Memory (RAM), dynamic RAM (DRAM), etc. The processor 1710 may retrieve the instructions from the memory 1720 and execute the instructions to perform the operations described above.

Note that any or all of the components and the associated hardware illustrated in FIG. 17 may be used in various embodiments of the system 1700. However, it should be appreciated that other configurations of the system 1700 may include more or less devices than those shown in FIG. 17.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that automatically manipulates and transforms data represented as physical (electronic) quantities within the computer system's registers and memories into other data similarly represented as physical quantities within the computer system memories or registers or other such information storage, transmission or display devices.

The embodiments of the invention also relate to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the embodiments of the invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Conclusion

The embodiments of the invention provide a number of advantages as a result of using active circuits to compensate for clock skew during operation of ASICs. The active de-skewing circuitry is robust and can tolerate process variations in its manufacture and variations in operating conditions. If the inequality of equation 1 is satisfied for process, voltage, and temperature (PVT) corners, the network of distributed de-skew circuits can synchronize the skewed clock signals across the chip such that no neighboring partitions have a clock skew more than the guard band g. As the operating conditions of the chip change (e.g. temperature gradients), the de-skew circuits can quickly resynchronize the clocks, maintaining correct operation.

The embodiments of the invention reduce the design effort involved in synthesizing a clock distribution network for ASICs. The classical approach attempts to synthesize the clock distribution across the whole chip at once, a difficult problem due to its sheer size. A "divide-and-conquer" strategy is used in synthesizing the clock distribution network to avoid the synthesizing the entire chip all at once. The intra-partition or local clock distribution network inside each clock partition may performed using a classical synthesis approach. The synthesis inside a clock partition is performed on a smaller scale making it a simpler problem to solve. The synthesis of the global network that distributes the clock from the global clock root to the de-skew controllers in each partition is also a simpler problem. The number of partitions is smaller than the number of clock sinks. The design constraints may be relaxed as clock skew can be compensated by the de-skew circuits.

With de-centralized deskew control circuits in the embodiments of the invention, the de-skewing circuitry (phase detectors and controllers) are simpler and easier to design and synthesize. The embodiments of the invention utilize existing clock signals at a local level to de-skew the clock signals across a chip and do not require the distribution of a reference signal or a second master clock signal. Moreover, the decentralized deskew control circuits and the partition rules allow the clock de-skewing circuitry to be automatically synthesized by software across a chip so that it can be implemented in general ASICs.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. Instead the embodiments of the invention should be construed according to the claims that follow below

What is claimed is:

1. A method for designing an integrated circuit, the method comprising:
   automatically synthesizing circuit logic mapped to a technology library in response to a high level description language;
   automatically placing the circuit logic of functional blocks into a preliminary layout of an integrated circuit;
   automatically routing global interconnect wires between the functional blocks in the preliminary layout of the integrated circuit;
   automatically analyzing the timing of the preliminary layout of the integrated circuit; and
   automatically synthesizing a clock distribution network in the preliminary layout in response to the placing of the circuit logic, the routing of the global interconnect wires, and the analyzing of the timing;
   wherein automatically synthesizing the clock distribution network includes automatically synthesizing clock de-skew circuitry including a plurality of de-skew control circuits, each having dynamic de-skew control logic;
   wherein one or more of the automatically synthesizing, placing, routing, and analyzing is performed with a processor.

2. The method of claim 1, wherein
the automatically synthesizing of the clock distribution network includes
   automatically synthesizing the clock de-skew circuitry into a plurality of clock partitions to control clock skew between neighboring partitions.

3. The method of claim 2, wherein
the automatically synthesizing of the clock distribution network further includes
   automatically synthesizing a global clock network from a master clock generator for each clock source that is coupled to the clock de-skew circuitry within each of the plurality of clock partitions.

4. The method of claim 2, wherein
the clock de-skew circuitry further includes
   one or more phase detectors coupled between one or more neighboring partitions,
   wherein one of the plurality de-skew control circuits is within each partition and is coupled to the one or more phase detectors.

5. The method of claim 4, wherein
the clock de-skew circuitry further includes
   a level shifter to receive a first clock signal having first voltage levels different from second voltage levels of a second clock signal, the level shifter to shift the first voltage levels towards second voltage levels to compare the first clock signal and the second clock signal.

* * * * *